(12) United States Patent
Zhao et al.

(10) Patent No.: US 12,266,190 B2
(45) Date of Patent: Apr. 1, 2025

(54) OBJECT IDENTIFICATION IN BIRD'S-EYE VIEW REFERENCE FRAME WITH EXPLICIT DEPTH ESTIMATION CO-TRAINING

(71) Applicant: Waymo LLC, Mountain View, CA (US)

(72) Inventors: Albert Zhao, Saratoga, CA (US); Vasiliy Igorevich Karasev, San Francisco, CA (US); Hang Yan, Sunnyvale, CA (US); Daniel Rudolf Maurer, Mountain View, CA (US); Alper Ayvaci, San Jose, CA (US); Yu-Han Chen, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 322 days.

(21) Appl. No.: 17/884,356

(22) Filed: Aug. 9, 2022

(65) Prior Publication Data

US 2024/0096105 A1    Mar. 21, 2024

(51) Int. Cl.
*G06V 20/58* (2022.01)
*G06T 7/55* (2017.01)
(Continued)

(52) U.S. Cl.
CPC ............... *G06V 20/58* (2022.01); *G06T 7/55* (2017.01); *G06V 10/44* (2022.01); *G06V 10/82* (2022.01);
(Continued)

(58) Field of Classification Search
None
See application file for complete search history.

(56) References Cited

U.S. PATENT DOCUMENTS

2020/0160559 A1  5/2020 Urtasun et al.
2021/0026355 A1* 1/2021 Chen ............... G05D 1/0088
(Continued)

FOREIGN PATENT DOCUMENTS

EP      3926360 A1   12/2021

OTHER PUBLICATIONS

Cody, R., et al., "Categorical Depth Distribution Network for Monocular 3D Object Detection," 2021 IEEE/CVF Conference on Computer Vision and Pattern Recognition (CVPR), Jun. 2021, pp. 8551-8560, XP034010083, DOI: 10.1109/CVPR46437.2021.00845.

(Continued)

*Primary Examiner* — Haris Sabah
(74) *Attorney, Agent, or Firm* — LOWENSTEIN SANDLER LLP

(57) ABSTRACT

The described aspects and implementations enable efficient detection and classification of objects with machine learning models that deploy a bird's-eye view representation and are trained using depth ground truth data. In one implementation, disclosed are system and techniques that include obtaining images, generating, using a first neural network (NN), feature vectors (FVs) and depth distributions pixels of images, wherein the first NN is trained using training images and a depth ground truth data for the training images. The techniques further include obtaining a feature tensor (FT) in view of the FVs and the depth distributions, and processing the obtained FTs, using a second NN, to identify one or more objects depicted in the images.

20 Claims, 12 Drawing Sheets

(51) Int. Cl.
  G06V 10/44 (2022.01)
  G06V 10/82 (2022.01)
  G06T 3/4046 (2024.01)
  G06V 10/40 (2022.01)
  G06V 10/70 (2022.01)
  G06V 20/69 (2022.01)
  G06V 30/18 (2022.01)

(52) U.S. Cl.
  CPC .............. G06T 3/4046 (2013.01); G06T 2207/20081 (2013.01); G06T 2207/20084 (2013.01); G06T 2207/30252 (2013.01); G06V 10/40 (2022.01); G06V 10/70 (2022.01); G06V 20/698 (2022.01); G06V 30/18086 (2022.01)

(56) References Cited

U.S. PATENT DOCUMENTS

| | | | |
|---|---|---|---|
| 2021/0110557 A1* | 4/2021 | Busey | G06T 19/006 |
| 2022/0035376 A1 | 2/2022 | Laddah et al. | |
| 2022/0165052 A1* | 5/2022 | Gan | G06V 10/774 |
| 2022/0309672 A1* | 9/2022 | Cherian | G06N 3/045 |
| 2023/0206393 A1* | 6/2023 | Hutchcroft | G06V 10/26 |
| | | | 382/284 |

OTHER PUBLICATIONS

Huang et al., "BEVDet4D: Exploit Temporal Cues in Multi-camera 3D Object Detection," Jun. 2022, 11 pages, XP091248196.
International Search Report and Written Opinion for Application No. PCT/US2023/013161, Jun. 16, 2023, 15 pages.
International Search Report and Written Opinion for International Application No. PCT/US2023/013055, mailed May 2, 2023, 15 Pages.
International Search Report and Written Opinion for International Application No. PCT/US2023/029667, mailed Oct. 11, 2023, 15 Pages.
Kim J., et al., "Low-Level Sensor Fusion for 3D Vehicle Detection Using Radar Range-Azimuth Heatmap and Monocular Image," 16th European Conference on Computer Vision—ECCV 2020, Feb. 25, 2021, pp. 388-402, (Section 2, 4, and 5; figures 3, 5, 6; table 2), XP047577720.
Li et al., "BEVDepth: Acquisition of Reliable Depth for Multi-view 3D Object Detection," Jun. 2022, 12 pages, XP091254736.
Philion et al., "Lift, Splat, Shoot: Encoding Images From Arbitrary Camera Rigs by Implicitly Unprojecting to 3D," Aug. 2020, 17 pages, XP081739891.
Hu et al., "FIERY: Future Instance Prediction in Bird's-Eye View from Surround Monocular Cameras," arXiv:2104.10490 [cs.CV], Oct. 18, 2021, 16 pages.

* cited by examiner

OBJECT IDENTIFICATION IN BIRD'S-EYE VIEW REFERENCE FRAME WITH EXPLICIT DEPTH ESTIMATION CO-TRAINING

TECHNICAL FIELD

The instant specification generally relates to systems and applications that detect and classify objects and, in particular, to autonomous vehicles and vehicles deploying driver assistance technology. More specifically, the instant specification relates to processing of perspective camera images using machine learning techniques for faster and more resource-efficient detection and classification of objects, including but not limited to vehicles, pedestrians, bicyclists, animals, and the like.

BACKGROUND

An autonomous (fully or partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
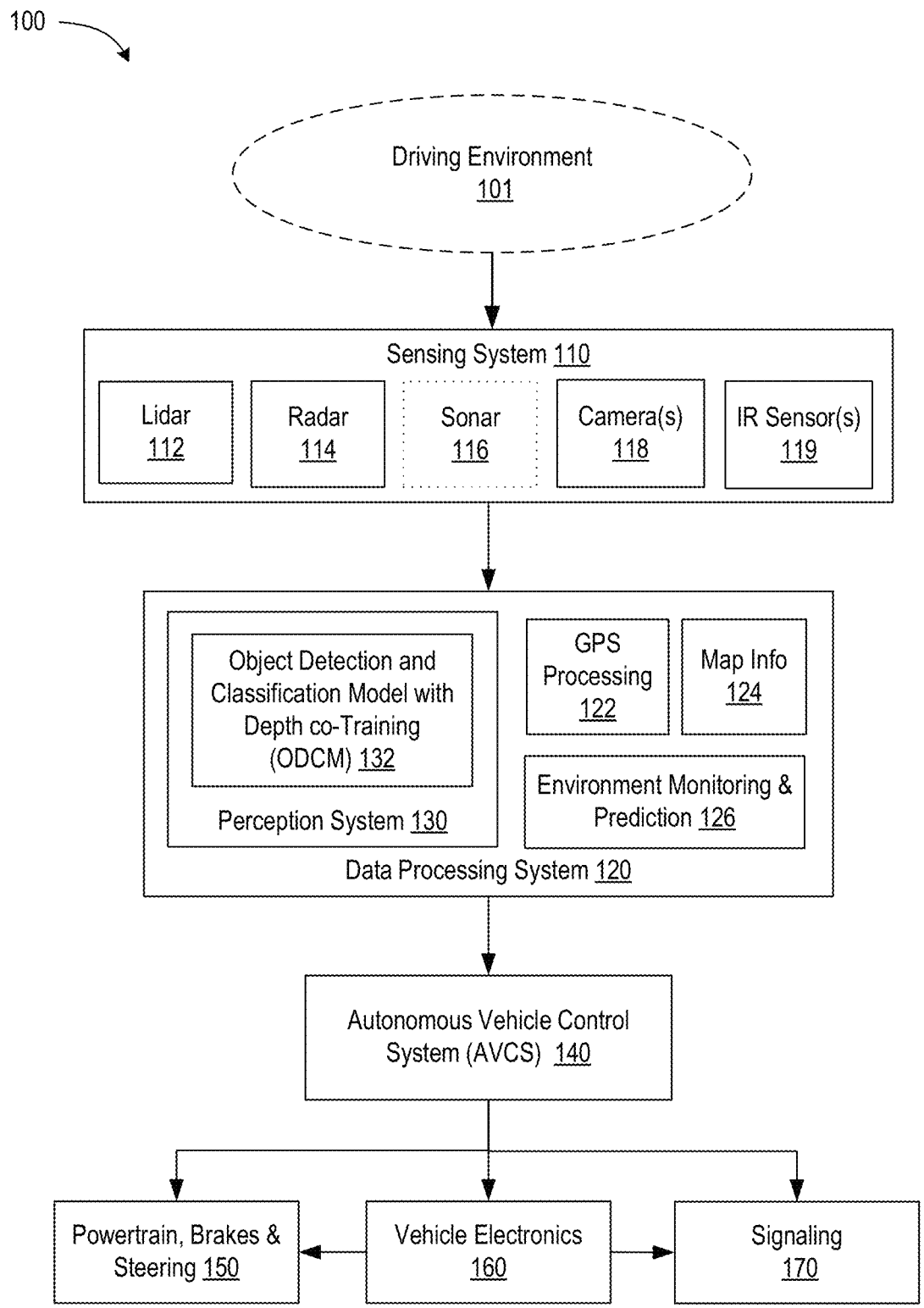
FIG. 1 is a diagram illustrating components of an example autonomous vehicle (AV) deploying a model that uses bird's-eye view and is trained using depth ground truth data for efficient detection and classification of objects, in accordance with some implementations of the present disclosure.

In one implementation, disclosed is a method that includes obtaining one or more perspective camera images of an environment and generating, using a first neural network (NN), for each pixel of a set of pixels of the one or more perspective camera images, a feature vector (FV), and a depth distribution for a portion of the environment imaged by a corresponding pixel. The first NN is trained using a plurality of training images and a depth ground truth data for the plurality of training images. The method further includes obtaining, for each pixel of the set of pixels, a feature tensor (FT) in view of (i) the FV for a respective pixel and (ii) the depth distribution for the respective pixel. The method further includes processing the obtained FTs, using a second NN, to identify one or more objects in the environment.

In another implementation, disclosed is a method of training a student model, the method includes obtaining a training image and processing, using a first NN of the student model, the training image to generate a plurality of FVs, and a plurality of depth distributions. Each FV of the plurality of FVs and each depth distribution of the plurality of depth distributions are associated with a respective pixel of a plurality of pixels of the training image. The method further includes obtaining a plurality of ground truth FVs generated by a first NN of a teacher model, each ground truth FV of the plurality of ground truth FVs being associated with a respective pixel of the plurality of pixels of the training image. The method further includes obtaining a plurality of ground truth depth indicators, each ground truth depth indicator of the plurality of ground truth depth indicators being associated with a respective pixel of at least a subset of the plurality of pixels of the training image. The method further includes adjusting parameters of the first NN of the student model. The adjustment is based on a comparison of the plurality of FVs with the plurality of ground truth FVs, and further based on a comparison of the plurality of depth distributions with the plurality of ground truth depth indicators.

In another implementation, disclosed is a system that includes a memory and a processing device. The processing device is configured to obtain one or more perspective camera images of an environment and generate, using a first NN, for each pixel of a set of pixels of the one or more perspective camera images, a FV, and a depth distribution for a portion of the environment imaged by a corresponding pixel. The first NN is trained using a plurality of training images and a depth ground truth data for the plurality of training images. The processing device is further configured to obtain, for each pixel of the set of pixels, a FT in view of (i) the FV for a respective pixel and (ii) the depth distribution for the respective pixel. The processing device is further configured to process the obtained FTs, using a second NN, to identify one or more objects in the environment.

DETAILED DESCRIPTION

Although various implementations can be described below, for the sake of illustration, using autonomous driving systems and driver assistance systems as examples, it should be understood that the techniques and systems described herein can be used for tracking of objects in a wide range of applications, including aeronautics, marine applications, traffic control, animal control, industrial and academic research, public and personal safety, or in any other application where automated detection of objects is advantageous.

In one example, for the safety of autonomous driving operations, it can be desirable to develop and deploy techniques of fast and accurate detection, classification, and tracking of various road users and other objects encountered on or near roadways, such as road obstacles, construction equipment, roadside structures, and the like. An autonomous vehicle (as well as various driver assistance systems) can take advantage of a number of sensors to facilitate detection of objects in a driving environment and determine the motion of such objects. The sensors typically include radio detection and ranging sensors (radars), light detection and ranging sensors (lidars), digital cameras of multiple types, sonars, positional sensors, and the like. Different types of sensors provide different and often complementary benefits. For example, radars and lidars emit electromagnetic signals (radio signals or optical signals) that reflect from the objects and carry information allowing to determine distances to the objects (e.g., from the time of flight of the signals) and velocities of the objects (e.g., from the Doppler shift of the frequencies of the signals). Radars and lidars can cover an entire 360-degree view, e.g., by using a scanning transmitter of sensing beams. Sensing beams can cause numerous reflections covering the driving environment in a dense grid of return points. Each return point can be associated with the distance to the corresponding reflecting object and a radial velocity (a component of the velocity along the line of sight) of the reflecting object.

Existing systems and methods of object identification and tracking use various sensing modalities, e.g., lidars, radars, cameras, etc., to obtain images of the environment. The images can then be processed by trained machine learning models to identify locations of various objects in the images (e.g., in the form of bounding boxes), state of motion of the objects (e.g., speed, as detected by lidar or radar Doppler effect-based sensors), type of the object (e.g., a vehicle or pedestrian), and so on. Motion of objects (or any other evolution, such as splitting of a single object into multiple objects) can be performed by creating and maintaining tracks associated with a particular object.

Using multiple sensing modalities (e.g., lidars, radars, cameras, etc.) to obtain often complementary data improves precision of object detection, identification, and tracking but comes at a substantial cost in sensing hardware and processing software. For example, a lidar sensor can provide valuable information about distances to various reflecting surfaces in the outside environment. A lidar sensor, however, is an expensive optical and electronic device that operates by actively probing the outside environment with optical signals and requires considerable maintenance and periodic calibration. Lidar returns (the point cloud) have to be processed, segmented into groups associated with separate hypothesized objects, and matched with objects detected using other sensing modalities (e.g., cameras), which requires additional processing and memory resources. Cameras, on the other hand, operate by passively collecting light (and/or infrared electromagnetic waves) emitted (or reflected) by objects of the environment and are significantly simpler and cheaper in design, installation, and operations. Consequently, various driver assistance systems that do not deploy lidars (for costs and maintenance reasons) are typically equipped with one or more cameras. Cameras can also be more easily installed at various stationary locations and used for traffic monitoring and control, public and private safety applications, and the like. Being based on optical or infrared imaging technology, cameras have certain advantages over radars, which, while allowing detection of distances to (and velocities of) objects, operate in a range of wavelengths that has intrinsically lower resolution compared with cameras. An ability to detect and identify objects based on camera-only images is, therefore, beneficial.

Cameras, however, produce projections of a three-dimensional (3D) outside environment onto a two-dimensional imaging surface (e.g., an array of camera's light detectors), which may be a plane or a curved surface. This gives rise to two related challenges. On one hand, distances to objects (often referred to depths of the objects in the image) are not immediately known (though can often be determined from the context of the imaged objects). On the other hand, camera images have perspective distortions causing the same number of pixels separating images of objects to correspond to different distances between objects depending on the depths of the objects. Additionally, objects whose depictions are proximate to each other can nonetheless be separated by a significant distance (e.g., a car and a pedestrian visible behind the car). The existing machine learning techniques of object detection sometimes attempt to map objects from the perspective view to the top-down view, also known as the bird's-eye view (BEV), in which objects are represented on a convenient manifold, e.g., a plane viewed from above and characterized by a simple set of Cartesian coordinates. Object identification and tracking can subsequently be performed directly within the BEV representation. Success of such techniques depends on accurate mapping of the objects to BEV. This, in turn, requires precise estimates of distances to various objects since misplacing of the objects within the BEV can result not only in an error in ascertaining a distance to a road user but may also lead to a loss of important contextual information.

Aspects and implementations of the present disclosure address these and other challenges of the existing technology by enabling methods and systems that use depthinformed training of machine learning object detection, classification, and tracking models. In particular, the disclosed techniques include a system of neural networks (NNs) trained to process perspective camera images. A first NN can be configured to associate context with various pixels (e.g., in the form of a feature vector) and further estimate a probability for the pixels to have a number of discretized depth values. As described in more detail below, the first neural network can be trained using training camera images annotated with ground truth that includes depth data for at least some pixels of the images. The depth data can be obtained by a suitable sensor capable of detecting distances to objects, e.g., a lidar, radar, sonar, or any other distance-aware sensor. During inference, the trained first NN can process a new set of perspective camera images and can estimate the depth to various pixels, e.g., as probability $P(d)$ that a given pixel depicts an object (or a part of an object) that is located at a distance d from the camera. The distance distribution can be combined with the feature vector $FV(c)$ (where c is a context space index) of the pixel to obtain a feature tensor $FT(c,d)$ that characterizes both the likely locations (depths or distances d to the object) and the object's context. Feature tensors for various pixels with coordinates w,h within the image can be used to obtain a combined feature tensor $\{FT(c,d)_{w,h}\} \rightarrow CFT(c,d,w,h)$ for the whole image. A mapping transformation d,w,h→x,y,z from perspective coordinates, w,h,d (width, height, depth) to a set of Cartesian coordinates x,y,z may then be performed. Subsequently, the combined feature tensor in the new coordinates, $CFT(c,x,y,z)$, can be projected onto a horizontal surface, e.g., by averaging or summing elements of the combined feature tensor along a vertical pillar of pixels, to obtain a BEV projected context tensor, $PCT(c,x,y)=\Sigma_i CFT(c,x,y,z_i)$. The projected context tensor $PCT(c,x,y)$ can then be processed by a second trained NN that identifies objects, extracts semantic information (e.g., a type of the objects), precise localization of the objects, and the like.

Numerous variations of these techniques are described herein. In some implementations, the first NN can include a first subnetwork trained to output depth distributions $P(d)$ and a separate second NN trained to output feature vectors $FV(c)$. In some implementations, the first NN and the second NN can be trained concurrently. In such implementations, the first NN and the second NN are subnetworks of an end-to-end model architecture that is trained jointly. In some implementations, the first NN can be trained first using both the training images and the depth ground truth with the second NN trained next, using the training images but not the depth ground truth. Any number of images taken at the same time (or at approximately the same time) can be processed concurrently, e.g., multiple images taken by a surround-view camera (SVC) taken during a single cycle of the camera. In some implementations, images taken at different times can be processed concurrently. For example, images taken at a specific time $t_j$ can be used to generate a respective BEV context tensor $PCT(c,x,y;t_j)$. Multiple BEV context tensors can then be processed at once by the second NN. Multiple depictions of the same objects at the same or different locations at multiple times can increase the likelihood of a correct segmentation and identification of objects in the images. In some implementations, the second NN can have a common backbone and multiple classification heads. For example, one classification head can trained to output semantic segmentation of the input images. A second classification head can be trained to output geometric centers of various objects. A third classification head can be trained to output distances of various pixels in the BEV representation to the geometric centers of the objects. The combined output of the classification heads can be used to provide identification of the boundaries of the objects together with classifications (types, classes) of the objects. In some implementations, training of the first NN and/or second NN can be performed using a teacher-student distillation framework. More specifically, an output of a teacher model, trained using data obtained using multiple sensing modalities (cameras, lidars, radars, sonars, and the like) can be used as a ground truth to train the NNs of a student model. The student model can be a distillation of the teacher model, e.g., a model having a reduced number of neuron layers and/or neurons within specific layers. As a result, the student model can maintain a substantial functionality of the teacher model while being more readily deployable on-board a vehicle having less potent processing and memory resources.

Described implementations depart from the conventional object detection and classification paradigm in supplementing BEV segmentation techniques with efficient co-training of the models using depth ground truth data. Advantages of the described implementations include (but are not limited to) fast and accurate detection, identification, and tracking of objects in a way that avoids large computational overheads of processing of data of multiple sensing modalities. Since the machine learning models trained and deployed as disclosed herein are capable of efficient object detection based on camera images, the models can be deployed on a variety of platforms (e.g., autonomous vehicles and vehicles equipped with driver-assisted technology) including systems with modest computational resources.

FIG. 1 is a diagram illustrating components of an example autonomous vehicle (AV) 100 deploying a model that uses bird's-eye view and is trained using depth ground truth data for efficient detection and classification of objects, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, falling leaves, etc.). Hereinafter, the term "driving environment" should be understood to include all environments in which an autonomous motion (e.g., SAE Level 5 and SAE Level 4 systems), conditional autonomous motion (e.g., SAE Level 3 systems), and/or motion of vehicles equipped with driver assistance technology (e.g., SAE Level 2 systems) can occur. Additionally, "driving environment" can include any possible flying environment of an aircraft (or spacecraft) or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical, infrared, radio wave, etc.) and non-electromagnetic (e.g., acoustic) sensing subsystems and/or devices. The sensing system 110 can include one or more lidars 112, which can be a laser-based unit capable of determining distances to the objects and velocities of the objects in the driving environment 101. The sensing system 110 can include one or more radars 114, which can be any system that utilizes radio or microwave frequency signals to sense objects within the driving environment 101 of the AV 100. The lidar(s) 112 and or radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. Each of the lidar(s) 112 and radar(s) 114 can include a coherent sensor, such as a frequency-modulated continuous-wave (FMCW) lidar or radar sensor. For example, lidar(s) 112 and/or radar(s) 114 can use heterodyne detection for velocity determination. In some implementations, the functionality of a ToF and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on AV 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 90 degrees in the vertical direction (e.g., with at least a part of the region above the horizon being scanned with lidar or radar signals). In some implementations (e.g., aerospace applications), the field of view can be a full sphere (consisting of two hemispheres).

The sensing system 110 can further include one or more cameras 118 to capture images of the driving environment 101. Cameras 118 can operate in the visible part of the electromagnetic spectrum, e.g., 300-800 nm range of wavelengths (herein also referred for brevity as the optical range). Some of the optical range cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, for active sound probing of the driving environment 101, e.g., ultrasonic sonars, and one or more microphones for passive listening to the sounds of the driving environment 101. The sensing system 110 can also include one or more infrared range cameras 119 also referred herein as IR cameras 119. IR camera(s) 119 can use focusing optics (e.g., made of germanium-based materials, silicon-based materials, etc.) that is configured to operate in the range of wavelengths from microns to tens of microns or beyond. IR camera(s) 119 can include a phased array of IR detector elements. Pixels of IR images produced by camera(s) 119 can be representative of the total amount of IR radiation collected by a respective detector element (associated with the pixel), of the temperature of a physical object whose IR radiation is being collected by the respective detector element, or any other suitable physical quantity.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate efficient and reliable detection, identification, and tracking of objects, including an object detection and classification model with depth co-training (ODCM) 132 that can be used to process data provided by the sensing system 110. In some implementations, during inference, ODCM 132 can receive data from (optical range) camera(s) 118 and/or IR camera(s) 119. During training, as described in more detail in conjunction with FIG. 2 and FIGS. 4A-B, ODCM 132 can process data from camera(s) 118 and/or IR camera(s) 119 while using range (distance) data obtained with at least some of lidar(s) 112, radar(s) 114, sonar(s) 116, and so on. ODCM 132 can include one or more trained machine-learning models (MLMs) that are used to process the received images to detect objects depicted in the images and to classify the detected objects.

The perception system 130 can further receive information from a Global Navigation Satellite System (GNSS) positioning subsystem (not shown in FIG. 1), which can include a GNNS transceiver (not shown), configured to obtain information about the position of the AV relative to Earth and its surroundings. The positioning subsystem can use the positioning data, e.g., GNNS and inertial measurement unit (IMU) data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data from sonar 116 or data from microphone picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with ODCM 132. For example, the environment monitoring and prediction component 126 can track relative motion of the AV and various objects (e.g., reference objects that are stationary or moving relative to Earth).

The data generated by the perception system 130, the GNSS processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, ODCM 132 can determine that images obtained by camera(s) 118 include depictions of an object and can further classify the object as a bicyclist. The environment monitoring and prediction component 126 can track the bicyclist and determine that the bicyclist is travelling with the speed of 15 mph along an intersecting road perpendicular to the direction of the motion of the vehicle. Responsive to such a determination, the data processing system 120 can determine that the vehicle needs to slow down to let the bicyclist clear the intersection. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; and (3) engage a brake unit to reduce (while acting in concert with the engine and the transmission) the vehicle's speed. After ODCM 132 and/or the environment monitoring and prediction component 126 determined that the bicyclist has crossed the intersection, the AVCS 140 can output instructions to the powertrain, brakes, and steering 150 to resume the previous speed settings of the vehicle.

Figure 2:
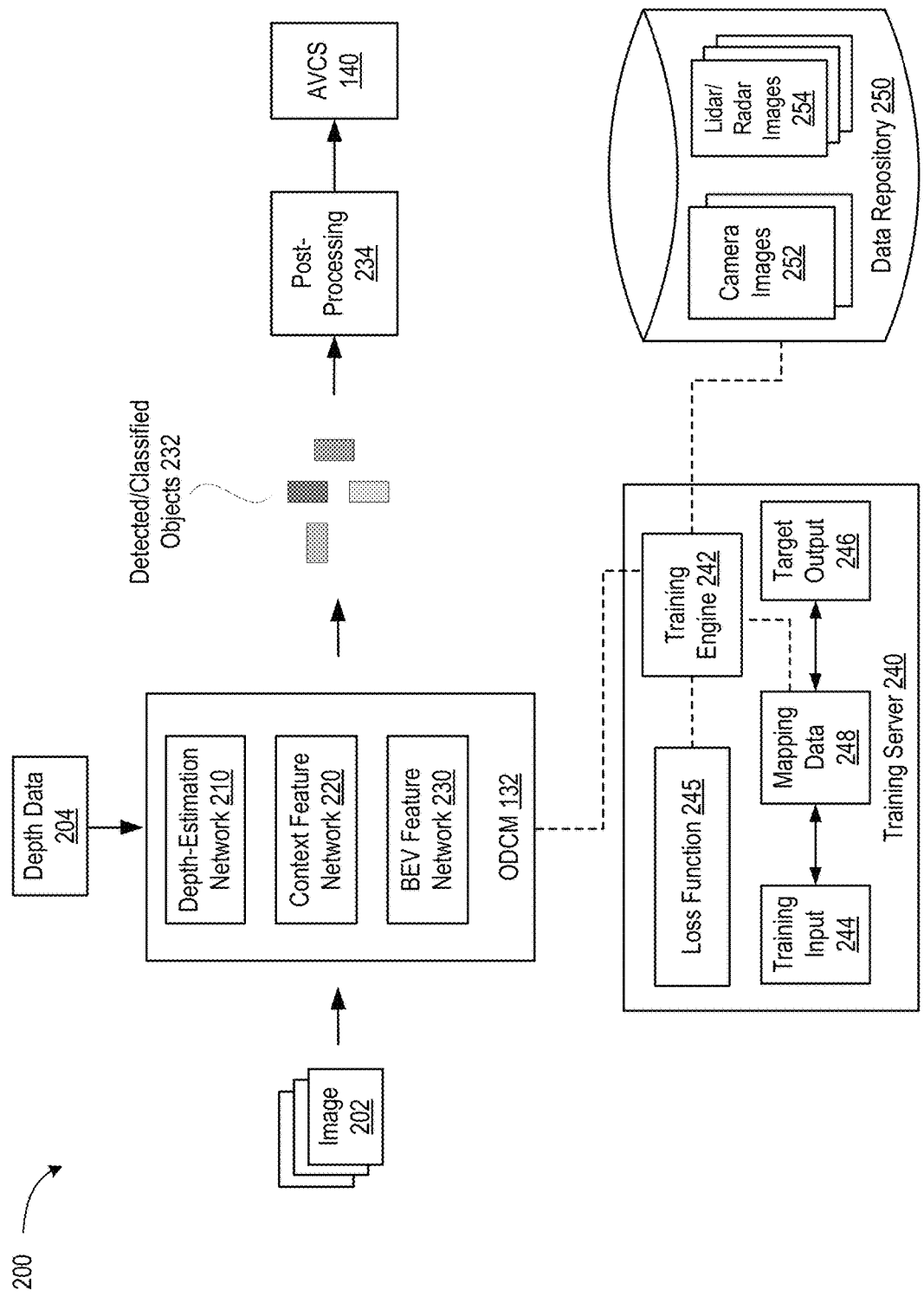
FIG. 2 is a diagram illustrating example architecture of a part of a perception system that is capable of efficient detection and classification of objects, in accordance with some implementations of the present disclosure.

FIG. 2 is a diagram illustrating example architecture 200 of a part of a perception system that is capable of efficient detection and classification of objects, in accordance with some implementations of the present disclosure. An input into the perception system (e.g., perception system 130 of FIG. 1) can include multiple camera images 202, which can be training images (during training phase) or images taken on-board at runtime (during inference phase). Images 202 can be combined into frames. A frame should be understood as any set of images depicting an outside environment along any direction relative to the sensing system (e.g., sensing system 110 of an autonomous vehicle). In particular camera image 202 can refer to panoramic images taken by a surround-view camera, images taken by directional cameras, e.g., frontal-view cameras, side-view cameras (SVCs), rear-view cameras, and the like, or any combination thereof. In some implementations, images obtained by different cameras can be synchronized, so that all images in a given frame have the same (up to an accuracy of synchronization) timestamp. In some implementations, some images in a given frame can have (controlled) time offsets, e.g., time offsets associated with a scanning motion of the SVC. Camera images 202 can be processed by ODCM 132. Additional input into ODCM 132 can include depth data 204, which can be data obtained using lidar sensor(s), radar sensor(s), sonar sensor(s), and the like. In some implementations, depth data 204 can be used during training of ODCM 132 but not during the inference phase. Images 202 and depth data 204 can include directional indexing. More specifically, various pixels of images 202 and return points of depth data 204 can be associated with known (e.g., from camera calibration) directions in space. For example, a camera image can include an intensity map indexed by any suitable set of coordinates characterizing directions in space, e.g., $I(w,h)$ where $w,h$ can be Cartesian pixel coordinates (within the imaging plane); $I(\theta,\phi)$, where $\theta$ and $\phi$ are polar and azimuthal angles, respectively; or any other set of coordinates. In some implementations, multiple sets of coordinates can be used for different tasks, facilitated by stored mappings (transformations) between different sets. Depth data 204 can include radial distances $R(w,h)$ to objects associated with specific pixels $w,h$ in images 202, e.g., as determined from the ToF of lidar/radar/sonar signals.

Each image 202 can have pixels of various intensities of one color $I(w,h)$ (for black-and-white images) or multiple colors $I_C(w,h)$ (for color images). At least some images 202 can be infrared (IR) camera images obtained by an array of IR detectors (pixels), which can operate in the range of wavelengths from microns to tens of microns or beyond. IR images can include intensity $IR(w,h)$ representative of the total amount of IR radiation collected by a respective detector. In some implementations, the IR images can include a pseudo-color map in which the presence of a particular pseudo-color can be representative of the collected total intensity $IR(w,h)$. In some implementations, the collected intensity can be used to determine a temperature map $T(w,h)$ of the environment. Accordingly, in different implementations, different representations (e.g., intensity maps, pseudo-color maps, temperature maps, etc.) can be used to represent the IR camera data.

In some implementations, architecture 200 can include a normalization module (not shown in FIG. 2) that can resize each image 202 to match the size of an input into ODCM 132. In some implementations, the normalization module can further normalize the intensity of the pixels of images 202 to a preset range of intensities, e.g., $[I_{min}, I_{max}]$, where $I_{min}$ is the minimum intensity and $I_{max}$ is the maximum intensity that ODCM 132 is configured to process. In some implementations, the minimum intensity can be zero, $I_{min}=0$. Additionally, the normalization module can perform other preprocessing of images 202 including filtering, denoising, and the like.

The normalized and pre-processed images can be processed by various components of ODCM 132 to detect presence of objects 232 in the driving environment and to classify the detected objects 232. ODCM 132 can include any suitable machine-learning models, such as lookup-tables, geometric shape mapping, mathematical formulas, decision-tree algorithms, support vector machines, deep neural networks, etc., or any combination thereof. Deep neural networks can include convolutional neural networks, recurrent neural networks (RNN), fully-connected neural networks, fully connected neural networks, long short-term memory neural networks, Boltzmann machines, and so on, or any combination thereof.

A depth-estimation network (DEN) 210 can output predictions of depths of objects imaged by various pixels of image(s) 202. A context feature network (CFN) 220 can output feature vectors for various pixels. Feature vectors can be multi-element strings of data in a feature space. Depth predictions and feature vectors can be joined into feature tensors. Feature tensors can undergo one or more transformations, as described in more detail in conjunction with FIGS. 3A-C, to map pixel data (intensity and depth) from the perspective view to a top-down BEV view. Feature tensors combined into a projected BEV context tensor can be processed by BEV feature network 230 that outputs detected/classified objects 232, which can be classified among a plurality of classes e.g., a car, a truck, a bus, a pedestrian, an unknown object, and the like.

Detected/classified objects 232 can undergo post-processing 234, which can include object tracking that tracks motion of the detected objects across multiple frames of images 202. Each object can be assigned a detection track and can be characterized by some or all of the following: bounding boxes for depictions of a particular object across multiple frames, type of the object, size of the object, pose of the object, motion of the object (e.g., velocity, acceleration, etc.), and the like. Post-processing 234 can further include generating any graphical, e.g., pixel-based (e.g., heat map) or vectorized (curve-based) representations of the tracks, including trajectories, poses, speed regime of various objects, and the like. In some implementations, post-processing 234 can include processing the detected tracks using one or more models that predict motion of the detected object, e.g., a model that tracks velocity, acceleration, etc., of the detected objects. For example, a Kalman filter or any other suitable filter, which combines predicted motion of a particular object with the detected motion of the object, can be used for more accurate estimation of the location and motion of the object.

Detected/classified objects 232 and tracking data generated by post-processing 234 can be provided to AVCS 140. AVCS 140 evaluates the trajectories of the objects in various tracks and determines whether to modify the current driving trajectory of the vehicle in view of the location and speed of the tracked objects. For example, if a tracked pedestrian or bicyclist is within a certain distance from the vehicle, the AVCS 140 can slow the vehicle down to a speed that ensures that the pedestrian or bicyclist can be safely avoided. Alternatively, AVCS 140 can change lanes, e.g., if an adjacent lane is free from obstructions, or perform some other driving maneuver.

Training can be performed by a training engine 242 hosted by a training server 240, which can be an outside server that deploys one or more processing devices, e.g., central processing units (CPUs), graphics processing units (GPUs), etc. In some implementations, ODCM 132 can be trained by training engine 242 and subsequently downloaded onto the vehicle that deploys perception system 130. ODCM 132 can be trained, as illustrated in FIG. 2, using training data that includes training inputs 244 and corresponding target outputs 246 (correct matches for the respective training inputs). During training of ODCM 132, training engine 242 can find patterns in the training data that map each training input 244 to the corresponding target output 246.

In some implementations, ODCM 132 can be trained using images and other sensing data that have been recorded during driving missions and annotated with ground truth. For training of depth-estimation network 210 of ODCM 132, ground truth can include distances to various pixels of images in training inputs 244. Training of BEV feature network 230 can involve ground truth that includes correct identification of locations (e.g., bounding boxes) of various objects in training inputs 244 and semantic (e.g., class, type, etc.) information for the objects. In some implementations, ground truth for training any or all of depth-estimation network 210, context feature network 220, and BEV feature network 230 can include outputs of one or more teacher models, as described below in conjunction with FIGS. 4A-B. Ground truth can include correct linkage of the same objects across batches of multiple images/frames, correct velocities of the objects, and the like.

Training engine 242 can have access to a data repository 250 storing multiple camera/IR camera images 252 and lidar/radar (or sonar) images 254 obtained during driving situations in a variety of driving environments (e.g., urban driving missions, highway driving missions, rural driving missions, etc.). During training, training engine 242 can select (e.g., randomly), as training data, a number of sets of camera/IR camera images 252 and sets of lidar/radar images 254. Training data can be annotated with correct object identifications. In some implementations, annotations can be made by a developer before the annotated training data is placed into data repository 250. Annotated training data retrieved by training server 240 from data repository 250 can include one or more training inputs 244 and one or more target outputs 246. Training data can also include mapping data 248 that maps training inputs 244 to target outputs 246. For example, mapping data 248 can identify a bounding box of a passenger car in each of a batch of N consecutive frames obtained by a forward-facing camera of a vehicle. The mapping data 248 can include an identifier of the training data, a location of the passenger car, size and identification of the passenger car, speed and direction of motion of the passenger car, and other suitable information.

During training of ODCM 132, training engine 242 can use a suitable loss function 245 to evaluate the difference between outputs of ODCM 132 (or various networks and subnetworks of ODCM 132) and target outputs 246. In some implementations, different loss functions 245 can be used for training of depth estimation network 210, context feature network 220, and/or BEV feature network 230. During training of ODCM 132, training engine 242 can change parameters (e.g., weights and biases) of various networks and subnetworks of ODCM 132 until the model successfully learns how to minimize loss function(s) 245 and successfully identify and classify target outputs 246, e.g., various objects in the outside environment. In some implementations, various networks and subnetworks of ODCM 132 can be trained separately, e.g., with depth estimation network 210 trained prior to training of context feature network 220 and/or BEV feature network 230. In some implementations, various networks and subnetworks of ODCM 132 can be trained together (e.g., concurrently). For example, depth estimation network 210, context feature network 220, and/or BEV feature network 230 can be subnetworks of a single end-to-end neural network architecture that is trained jointly.

The data repository 250 can be a persistent storage capable of storing camera/IR camera images, lidar/radar/sonar data, and data structures configured to facilitate detection and identification, in accordance with implementations of the present disclosure. The data repository 250 can be hosted by one or more storage devices, such as main memory, magnetic or optical storage disks, tapes, or hard drives, network-attached storage (NAS), storage area network (SAN), and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3A:
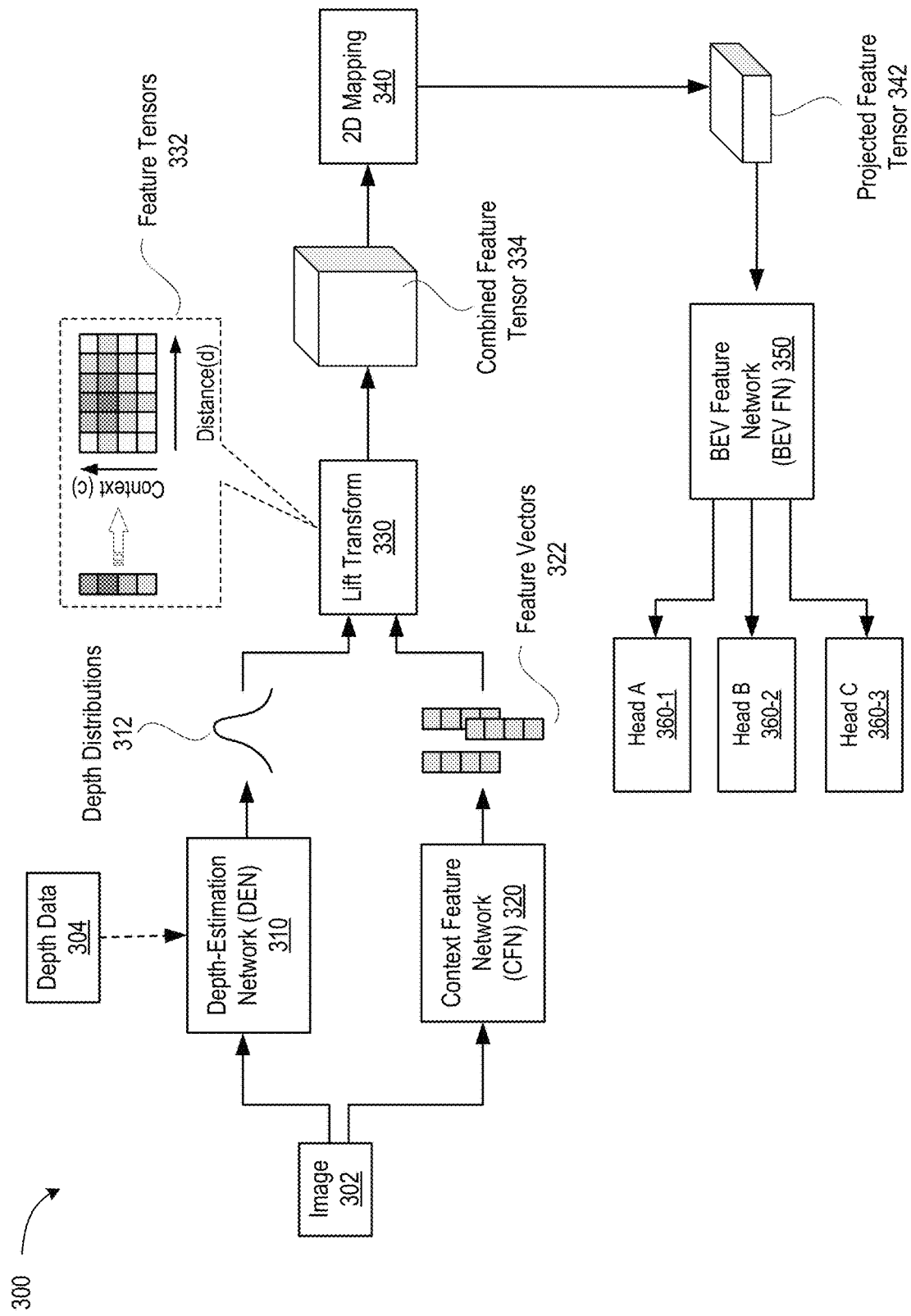
FIG. 3A is a schematic diagram illustrating example operations of a model that uses bird's-eye view and is trained using depth ground truth data for efficient detection and classification of objects, in accordance with some implementations of the present disclosure.

FIG. 3A is a schematic diagram illustrating example operations of a model 300 that uses bird's-eye view and is trained using depth ground truth data for efficient detection and classification of objects, in accordance with some implementations of the present disclosure. The model illustrated in FIG. 3A can be ODCM 132 of the perception system 130 depicted in FIG. 1 or any other similar model. In some implementations, the model illustrated in FIG. 3A can include a set of neural networks (NNs), e.g., depth-estimation network (DEN) 310, context feature network (CFN) 320, BEF feature network (BEF FN) 350, and the like. Although depicted as separate blocks in FIG. 3A, various illustrated NNs and subnetworks can be parts of the same NN, which are trained jointly. Neurons in the neural networks are associated with learnable weights and biases. The neurons can be arranged in layers. Some of the layers can be hidden layers. Any of the NNs or subnetworks depicted in FIG. 3A can include multiple hidden neuron layers and can be configured to perform one or more functions that facilitate detection and classification of objects.

Input into DEN 310 and CFN 320 can include one or more images 302, which can be perspective images acquired by one or more cameras. Any number of images 302 can be processed concurrently. Input image(s) 302 can depict any portion of the outside environment, up to a 360-degree panoramic surround view. In some implementations, the total number of pixels in all image(s) 302 can be W×H, where W is the number of pixels along a first direction (e.g., the horizontal direction) and H is the number of pixels along a second direction (e.g., the vertical direction). In some implementations, "pixel" of image 302 can correspond to a single element of a charged-coupled device (CCD) of a camera. In some implementations, "pixel" of image 302 can be a downsampled combination (superpixel) corresponding to multiple CCD elements of a camera. For example, one or more images of the cameras can have a number of pixels that is different from W×H, e.g., the dimensions of inputs of trained DEN 310 and CFN 320. In such implementations, camera images may first be rescaled (e.g., using techniques of interpolation, downsampling/upsampling, and the like) to the target input size W×H. Similarly, depth data 304 can be rescaled to the target input size W×H. In some implementations, depth data 304 can be available for only a subset of the W×H pixels, e.g., one depth value every N pixels.

Image(s) 302 can be in any suitable digital format (JPEG, TIFF, GIG, BMP, CGM, SVG, and so on). Image(s) 302 can be represented via one or more intensity matrices $I_k(w,h)$, where $0 \le w \le W$, and $0 \le h \le H$, with color index k having a single value (for black-and-white images), three values (for RGB images), four values (for CMYK images), and so on. The intensity values $I_k$ can assume continuous or discrete values between 0 and 1 (or between any other chosen limits, e.g., 0 and 255).

DEN 310 can be any suitable NN trained to identify a set of depth distributions 312 for various pixels, e.g., a probability $P(d)_{w,h}$ that a given pixel w,h depicts an object that is located at a distance d from the camera. In some implementations, distance d can be discretized among a number D of intervals, $\Delta d_1, \Delta d_2 \ldots \Delta d_D$. The intervals $\Delta d_i$ need not be of equal size, and can increase with the distance, e.g., $\Delta d_1 \cdot \Delta d_2 \le \ldots \le \Delta d_D$. The last interval $\Delta d_N$ can extend from a certain distance (e.g., 100 m, 200 m, etc.) to infinite distances.

DEN 310 can be trained using training images depicting objects in various environments and using depth data 304 as ground truth. Depth data 304 can be provided by lidar (radar, sonar, etc.) sensor(s) and can include actual distances $d_{True}(w,h)$ to the objects (or parts of the objects) that are imaged by corresponding camera pixels w,h. During training stage, training engine 242 of FIG. 2 can change parameters (e.g., weights and biases) of neurons of DEN 310 to minimize a loss function, which characterizes a difference between a center (e.g., average, median, etc.) of the distribution $P(d)_{w,h}$ output by DEN 310 and the ground truth distance $d_{True}(w,h)$. In some implementations, the distributions $P(d)_{w,h}$ can be modeled as a categorical distribution, a Laplace distribution, a Gaussian distribution, or any other suitable distribution. The loss function minimized during training can include a focal loss function, a negative log likelihood loss function, or any other suitable loss function, e.g., a mean square loss function, a cross-entropy loss function, and so on.

CFN 320 can be trained, e.g., using the same training images, to output feature vectors 322. A feature vector $FV(c)_{w,h}$ for pixel w,h represents a learned digital encoding characterizing the appearance of the corresponding pixel and the graphical context provided by other pixels of the image. Feature vectors FV(c) can have any number C of components (bits), $c \in [1,C]$, selected in view of the desired target accuracy of object detection and specific computational resources on which the trained model (e.g., ODCM 132) is to be deployed, e.g., C=32, 64, 128, 256, etc., components. Higher values C favor higher accuracy of object detection and classification while lower values C facilitate faster processing and/or deployment of the NNs on systems with limited computational resources.

In some implementations, DEN 310 and CFN 320 can be deep convolutional NNs, e.g., having a U-net architecture with an encoder stage and a decoder stage. Each stage can include multiple convolutional neuron layers and one or more fully connected layers. The convolutions performed by each of DEN 310 and CFN 320 can include any number of convolutional kernels of different dimensions trained to capture both the local as well as global context of the input images. In some implementations, DEN 310 and CFN 320 can be fully independent, e.g., with no edges connecting neurons of the two networks. In some implementations, DEN 310 and CFN 320 can share a common backbone and can have separate heads that output depth distributions 312 and feature vectors 322. Each head can have any number of neuron layers and, in some implementations, can have its own encoder-decoder architecture. In some implementations, at least some of the heads can include one or more fully-connected layers.

Depth distributions 312 and feature vectors 322 can be combined into feature tensors 332 by a lift transform 330. More specifically, lift transform 330 can supplement each pixel w,h, described by a feature vector $FV(c)_{w,h}$ with depth information from depth distributions 312. For example, lift transform 330 can compute an outer product of each feature vector $FV(c)_{w,h}$ (of dimensions C×1) with the corresponding depth distribution $P(d)_{w,h}$ (of dimensions D×1) for the same pixel. This generates a feature tensor 332, e.g., $FV(c)_{w,h} \otimes P(d)_{w,h} = FT(c,d)_{w,h}$ for pixel w,h, as illustrated schematically with the insert in FIG. 3A.

Feature tensors $FT(c,d)_{w,h}$ computed for individual pixels can then be used to obtain a combined feature tensor 334 for the whole image, e.g., by concatenating feature tensors 332 for different pixels: $\{FT(c,d)_{w,h}\} \rightarrow CFT(c,d,w,h)$. The combined feature tensor CFT(c,d,w,h) has dimensions C×D×W×H. The combined feature tensor 334 can then undergo a 2D mapping 340. More specifically, 2D mapping 340 can produce a projected feature tensor 342 that uses a convenient set of plane coordinates, e.g., Cartesian coordinates x and y or polar coordinates r and θ within the plane of the ground.

2D mapping 340 can be a two-part transformation. During the first part, perspective coordinates d,w,h can be transformed into 3D Cartesian coordinates d,w,h→x,y,z (or 3D cylindrical coordinates, w,h→r,θ,z), with z being the vertical coordinate (in the direction perpendicular to the ground). The transformation d,w,h→x,y,z can be a projective transformation, parameterized with a focal length of the camera, direction of the optical axis of the camera, and other similar parameters. In the instances where images 302 are acquired by multiple cameras (or a camera with a rotating optical axis), the transformation d,w,h→x,y,z can include multiple projective transformations, e.g., with a separate transformation used for pixels w,h provided by different cameras.

During the second part, 2D mapping 340 can project the combined feature tensor expressed in the new coordinates, CFT(c,x,y,z), onto a horizontal surface to obtain a projected (BEV) feature tensor 342. For example, to obtain the C×W×H projected feature tensor PCT(c,x,y), the combined feature tensor can be summed (or averaged) over elements associated with each vertical pillar of pixels, e.g., PCT(c,x,y)=$\Sigma_i$CFT(c,x,y,$z_i$). In some implementations, the summation over coordinates $z_i$ can be performed with different weights $w_i$ assigned to different coordinates $z_i$: PCT(c,x,y)= $\Sigma_i w_i \times$CFT(c,x,y,$z_i$), e.g., with larger weights $w_i$ assigned to pixels that image objects within a certain elevations from the ground (e.g., up to several meters) and lower weights assigned to other elevations (e.g., to eliminate spurious objects, such as tree branches, electric cables, etc., that do not obstruct motion of vehicles).

The projected feature tensor 342 characterizes objects and their locations in the BEV in which perspective distortions have been effectively eliminated. BEV FN 350 can then process the projected feature tensor 342 to identify objects depicted in images 302 and classify the identified objects. In some implementations, BEV FN 350 can be a network having both an encoder stage and a decoder stage. In some implementations, BEV FN 350 can be a network that has a decoder stage whereas the encoder stage is a part of CFN 320. In some implementations, BEV FN 350 can serve as a backbone for one or more classification heads 360-n. Each classification head 360-n can output a different kind of information about objects depicted in images 302. For example, head A 360-1 can output bounding boxes of the objects, head B 360-2 can output types and/or sizes of the objects, head C 360-3 can output the poses (position and orientation) of the objects, and so on.

Figure 3B:
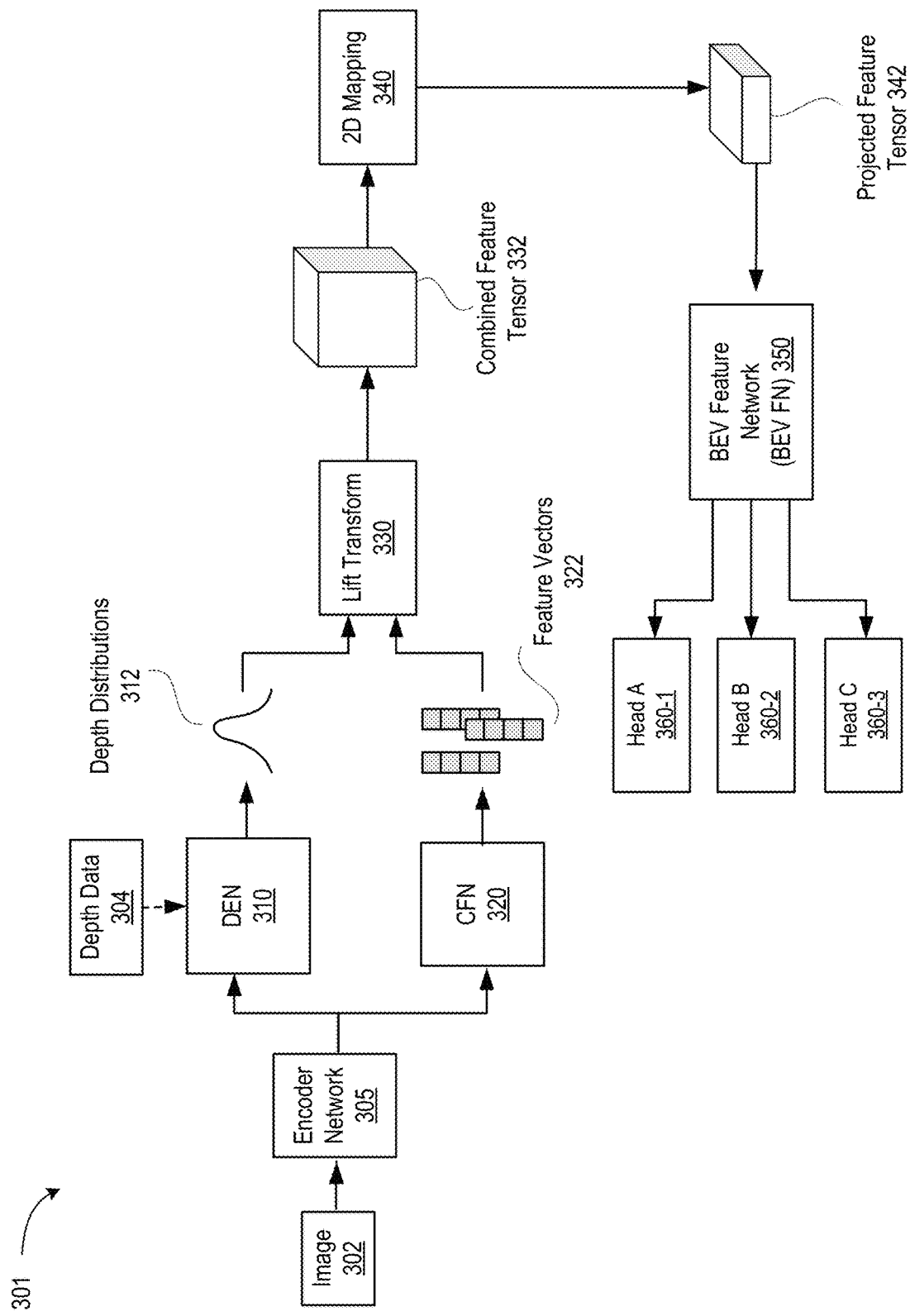
FIG. 3B is a schematic illustration of one implementation of a model that uses bird's-eye view and is trained using depth ground truth data for efficient detection and classification of objects.

DEN 310, CFN 320, and BEV FN 350 are depicted as separate blocks in FIG. 3A. and can each have an encoder stage and a decoder stage. Other implementations are also within the scope of this disclosure. More specifically, FIG. 3B is a schematic illustration of one implementation of a model 301 that uses bird's-eye view and is trained using depth ground truth data for efficient detection and classification of objects. As illustrated in FIG. 3B, DEN 310 and CFN 320 can be supported by a common backbone network, such as an encoder network 305. Each of DEN 310 and CFN 320 can be a separate decoder that is trained to process a common output of encoder network 305. In some implementations, CFN 320 can be a decoder network whereas DEN 310 can be a head of one or more fully-connected layers. In some implementations, none of DEN 310 or CFN 320 include a decoder. In some implementations, DEN 310 can be a decoder network whereas CFN 320 can be a head having one or more fully-connected layers. In some implementations, one of DEN 310 or CFN 320 can be absent. For example, if CFN 320 is absent, feature vectors 322 can be output by encoder network 305 directly whereas DEN 310 can include a decoder that further processes a copy of the output (feature vectors 322) to generate depth distributions 312.

Figure 3C:
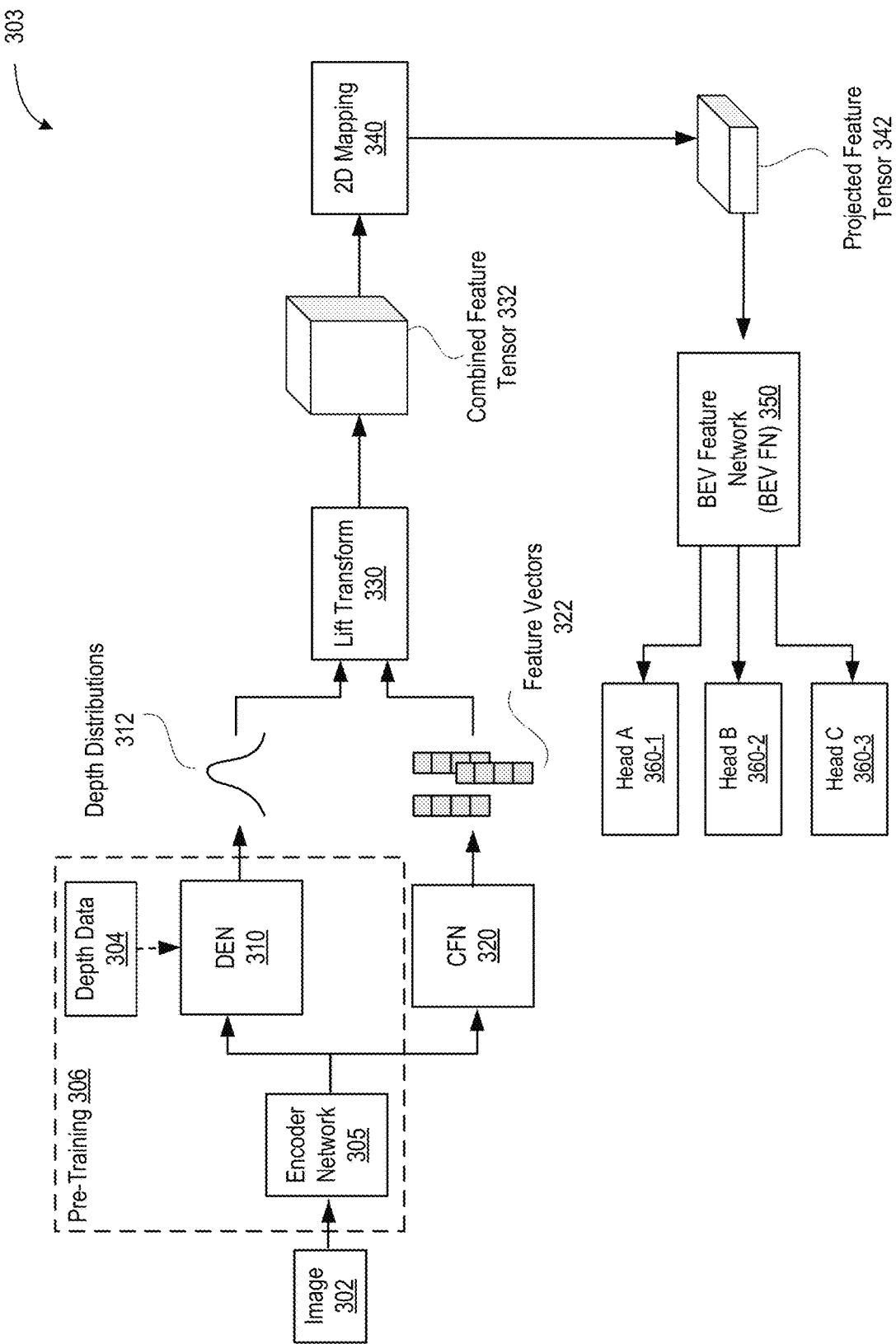
FIG. 3C illustrates a model in which a depth-estimation network is pre-trained using depth ground truth data, in accordance with some implementations of the present disclosure.

In some implementations, any or all of the encoder network 305, DEN 310, CFN 320, and BEV FN 350 can be trained together. In some implementations, some of the encoder network 305, DEN 310, CFN 320, or BEV FN 350 can be trained in stages. More specifically, FIG. 3C illustrates a model 303 in which a depth-estimation network 310 is pre-trained (together with encoder network 305, if deployed) using depth ground truth data, in accordance with some implementations of the present disclosure. Pre-training of DEN 310 may be performed using a suitable loss function that evaluates a difference between a center of the distribution $P(d)_{w,h}$ and the ground truth distance $d_{True}(w,h)$ provided by depth data 304. The difference can then be back-propagated through various layers of neurons of DEN 310 (encoder network 305, if deployed) until DEN 310 (and encoder network 305) learns to predict the probable depths of pixels with a desired accuracy. After pre-training 306 of DEN 310 (and encoder network 305, if deployed) is completed, the output of DEN 310 can be used as ground truth during training of CFN 320 and/or BEV FN 350, which can be trained together or sequentially.

Figure 4A:
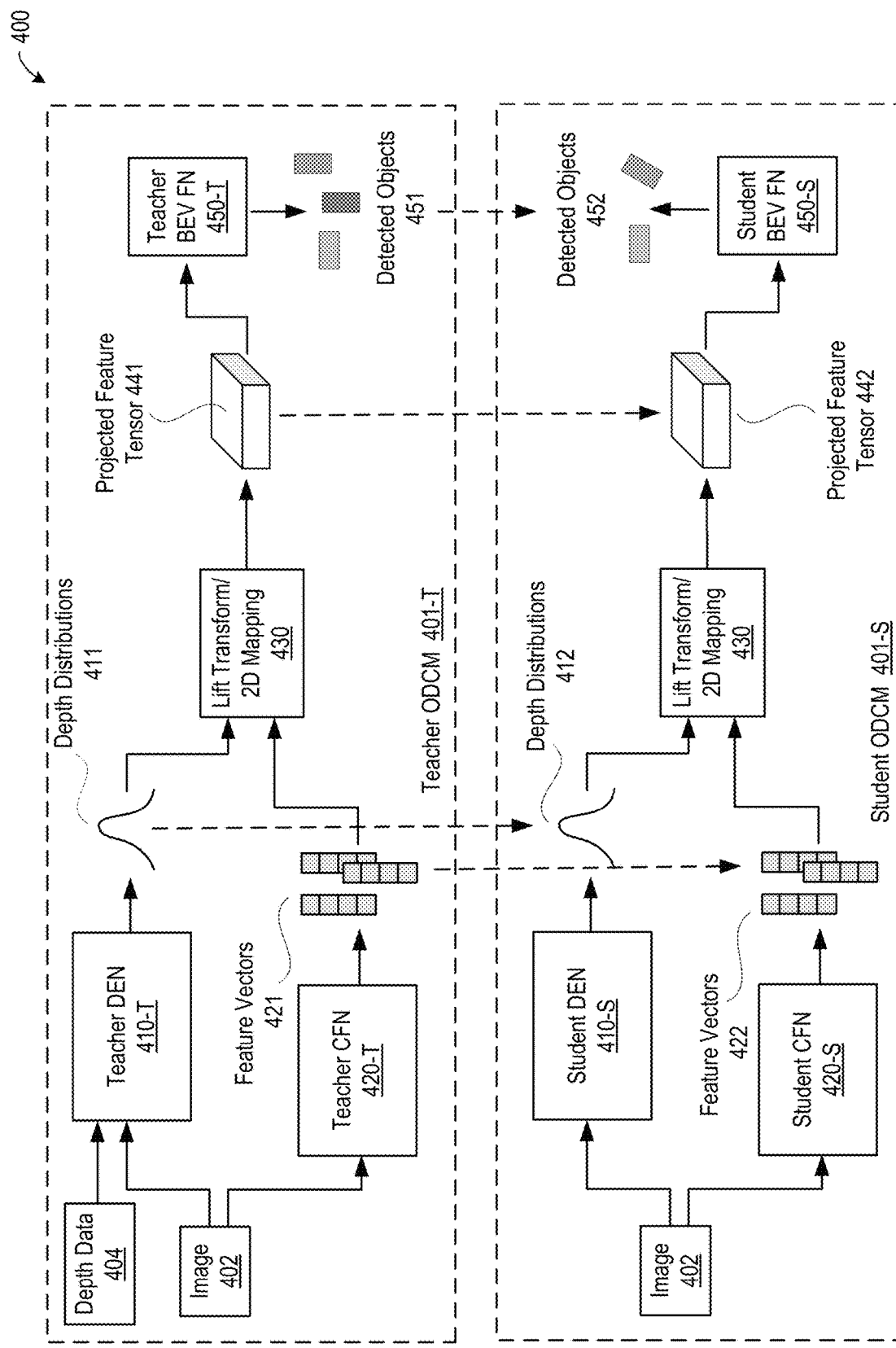
FIG. 4A is a schematic diagram illustrating a distillation framework for training of a bird's-eye view model using depth ground truth data, in accordance with some implementations of the present disclosure.

FIG. 4A is a schematic diagram illustrating a distillation framework 400 for training of a bird's-eye view model using depth ground truth data, in accordance with some implementations of the present disclosure. Distillation framework 400 can involve training a student model 401-S using outputs of a previously trained teacher model 401-T. Student model 401-S can include a student DEN 410-S, a student CFN 420-S, and a student BEV FN 450-S can operate substantially as described in relation to the respective networks of FIG. 3A-C. In particular, student DEN 410-S and student CFN 420-S can process one or more image(s) 402 and output depth distributions 412 and feature vectors 422 for various pixels of image(s) 402, which can undergo a lift transform/2D mapping 430, e.g., similar to lift transform 330 and 2D mapping 340 to obtain projected feature tensor 442. Student BEV FN 450-S can the processes projected feature tensor 442 to identify detected (and classified) objects 452.

Various outputs (including intermediate outputs) of student ODCM 401-S can be compared with ground truth obtained from teacher ODCM 401-T. In some implementations, as illustrated in FIG. 4A, teacher ODCM 401-T can have an architecture that is similar to the architecture of student ODCM 401-S. In particular, teacher DEN 410-T and teacher CFN 420-T can process one or more image(s) 402, which can be the same images as being input into student DEN 410-S and student CFN 420-S. Additionally, teacher DEN 410-T can process depth data 404 (e.g., lidar range data) associating depth of (distance to) objects depicted in image(s) 402. To accommodate additional depth data inputs 404, teacher DEN 410-T can have more input neurons compared with student DEN-S 410-S. Teacher DEN 410-T and teacher CFN 420-T can output depth distributions 411 and feature vectors 421 for pixels of image(s) 402, which can undergo lift transform/2D mapping 430 to generate projected feature tensor 441 that is then processed by teacher BEV FN 450-T to identify detected (and classified) objects 541.

To allow direct comparisons of various outputs (including intermediate outputs) of student ODCM 401-S with outputs of teacher ODCM 401-T, at least some of teacher DEN 410-T, teacher CFN 420-T, and teacher BEV FN 450-T can have the outputs of dimensions (the number of neurons in the output layers) that are the same as the output dimensions of student ODCM 401-S, student DEN 410-S, student CFN 420-S, and student BEV FN 450-S networks, respectively.

On the other hand, teacher networks can have a higher complexity, including the number of neuron layers, the number of connections between the layers, precision of representation (number of bits) of intermediate outputs, and the like. In some implementations, teacher DEN 410-T and teacher CFN 420-T can have more input neurons than the respective student networks and can, therefore, be configured to process images 402 with higher resolution than the student networks. Teacher ODCM 401-T can be used in an off-board setting whereas student ODCM 401-S can be used on-board a vehicle, a traffic monitoring station, or on any edge device having limited computational resources. As a result, teacher ODCM 401-T need not be limited in complexity and/or computational time.

Student ODCM 401-S can be a lightweight model having substantially fewer neurons and neuron layers than teacher ODCM 401-T and capable of faster processing (given the same processing and memory resources). The distillation process of obtaining student ODCM 401-S can include identifying and removing (culling, pruning) nodes and/or edges that have little or reduced effect on the output of the model, combining multiple neuron nodes and/or edges, and the like. Additionally, outputs of teacher ODCM 401-T can be used as ground truth during training of student ODCM 401-S, as depicted schematically with dashed arrows in FIG. 4A. More specifically, depth distributions 411 output by teacher DEN 410-T and feature vectors 421 output by teacher CFN 420-T can be used as ground truth during training of student DEN 410-S and student CFN 420-S. For example, depth distributions 412 (feature vectors 422) can be compared with depth distributions 411 (feature vectors 421) and the parameters of student DEN 410-S(student CFN 420-S) until the difference is minimized. Similarly, projected feature tensor 441 and detected objects 451 can be used as ground truth that is compared with projected feature tensor 442 and detected objects 452. In some implementations, a difference between detected objects 452 and ground truth detected objects 451 can be backpropagated through student BEV FN 450-S but not through student DEN 410-S and/or student CFN 420-S. In such implementations, student DEN 410-S is trained based on differences between depth distributions 412 and ground truth depth distributions 444 (and, similarly, student CFN 420-S is trained based on differences between feature vectors 422 and ground truth feature vectors 421). In other implementations, a difference between detected objects 452 and ground truth detected objects 451 can be additionally backpropagated through student DEN 410-S and/or student CFN 420-S.

Figure 4B:
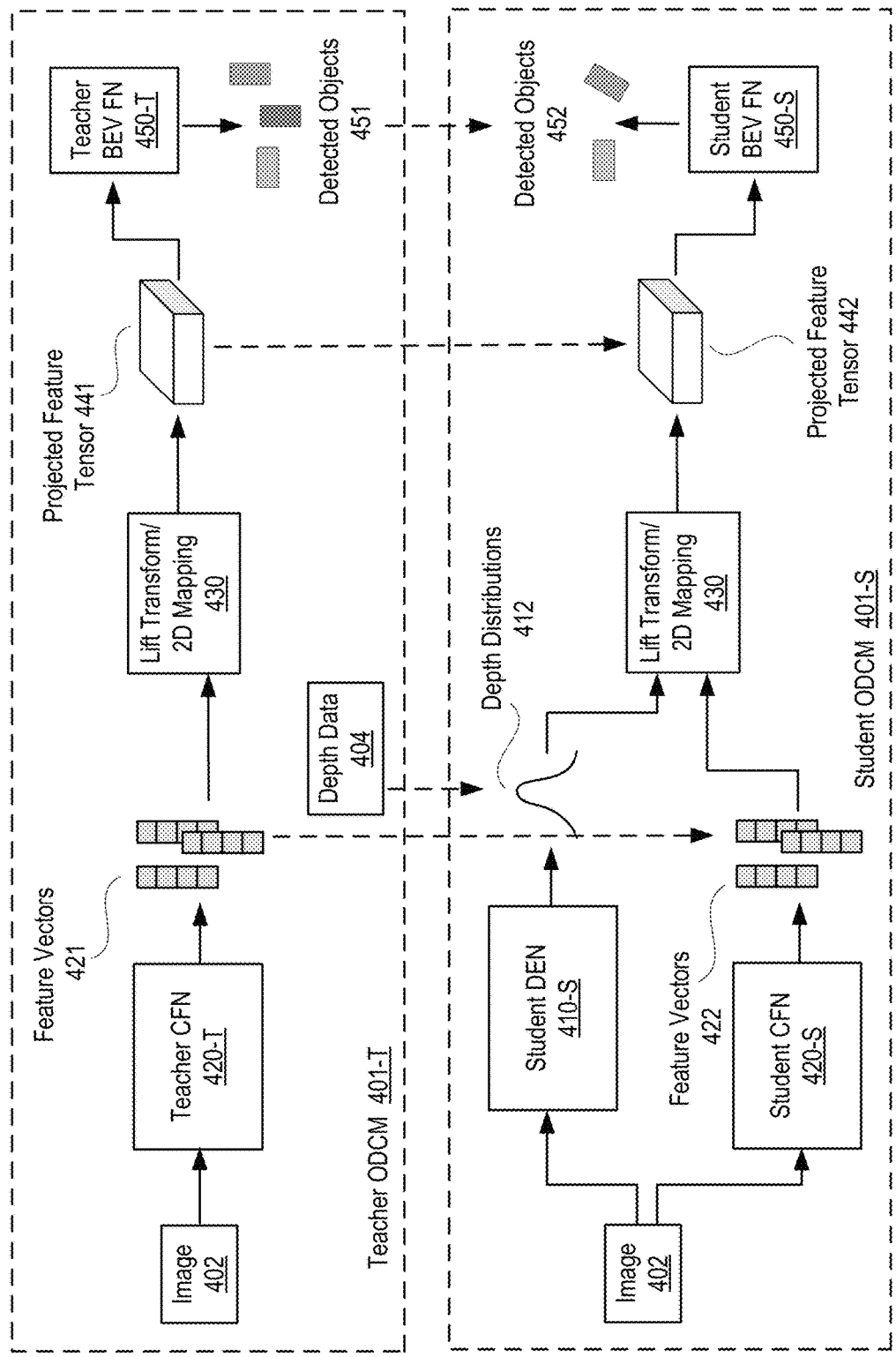
FIG. 4B is a schematic diagram illustrating another implementation of a distillation framework for training of a bird's-eye view model using depth ground truth data, in accordance with some implementations of the present disclosure.

FIG. 4B is a schematic diagram illustrating another implementation of a distillation framework 401 for training of a bird's-eye view model using depth ground truth data, in accordance with some implementations of the present disclosure. Distillation framework 401 can differ from distillation framework 400 of FIG. 4A in that teacher DEN 410-T is absent in and depth sensing data (e.g., lidar data or radar data) can be used as ground truth during training of student DEN 410-S in lieu of depth distributions 411.

Figure 5:
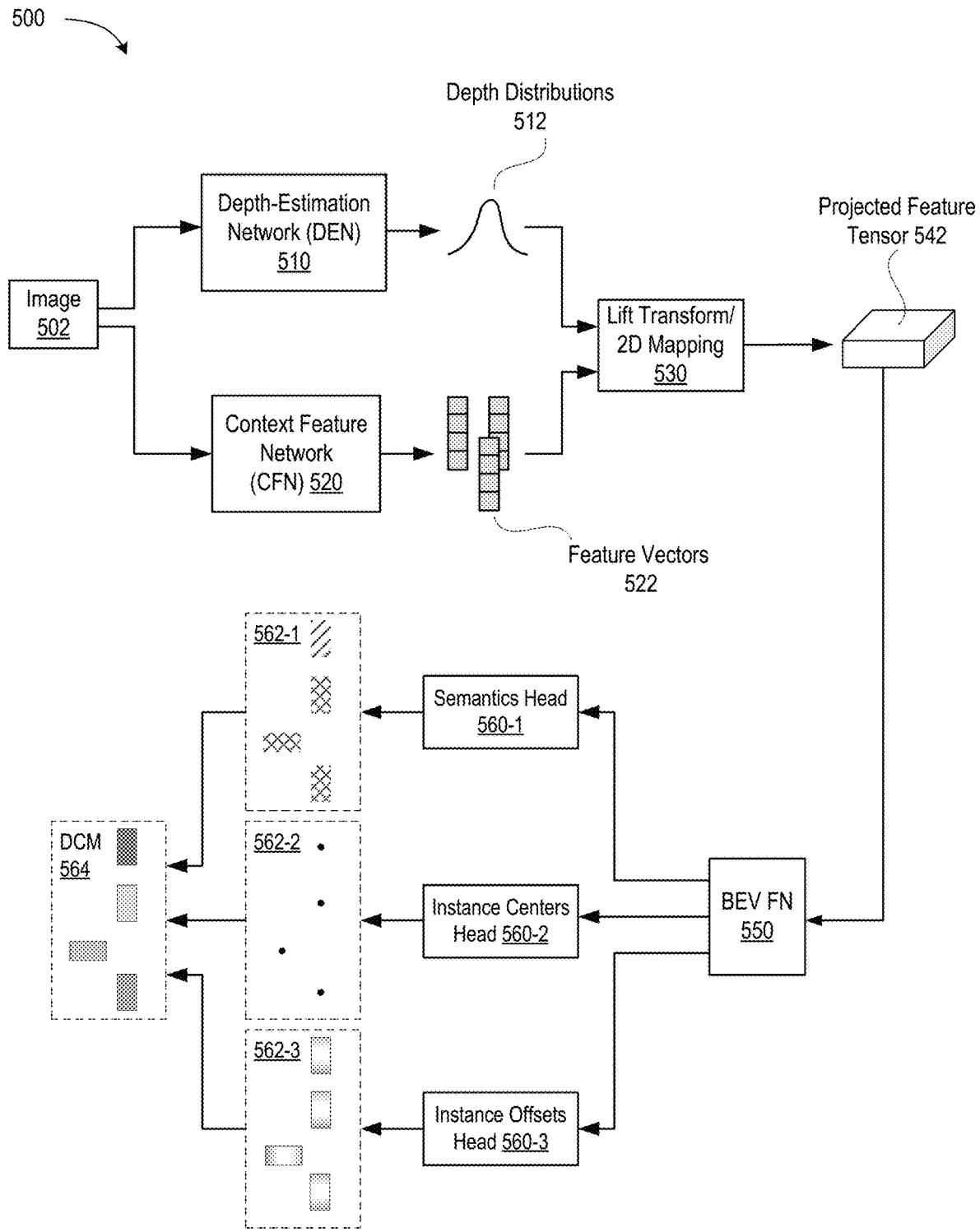
FIG. 5 is a schematic diagram illustrating operations of a bird's-eye view model that provides instance segmentation and semantic segmentation, in accordance with some implementations of the present disclosure.

FIG. 5 is a schematic diagram illustrating operations 500 of a bird's-eye view model that provides instance segmentation and semantic segmentation, in accordance with some implementations of the present disclosure. Operations 500 can include processing image(s) 502 using a DEN 510 to output depth distributions 512, and a CFN 520 to output feature vectors 522, and a lift transform/2D mapping 530 to obtain projected feature tensor 542. DEN 510 can be trained using depth data, e.g., as described in conjunction with FIG. 3A-C and/or FIG. 4A-B, or in any other similar way. A BEV FN 550 can be a backbone network that processes the projected feature tensor 542 and generates an intermediate output that is then provided to multiple classification heads 560-$n$. In some implementations, the classification heads can include a semantics head 560-1 that outputs an instance segmentation map 562-1 containing classification of various locations of BEV among a number of types, e.g., vehicles, vulnerable road users, roadway, buildings, trees, roadside structures, and so on. The classification heads 560-$n$ can include one or more instance segmentation heads. For example, an instance centers head 560-2 can output coordinates of centers 562-2 (e.g., center-of-mass pixels) of various objects in the environment. An instance offsets head 560-3 can output a map of offsets 560-3 that characterize distances of various pixels of the objects to the centers of the objects. Various maps 562-$n$ can be further processed by one or more layers of neurons (not shown in FIG. 5) to obtain a detection and classification map (DCM) 564. DCM 564 can combine semantic segmentation and geometric (instance) segmentation generated by classification heads 560-$n$ to determine the locations of the objects and further identify classes of the object. For example, type "vehicle" objects identified by semantics head 560-1 can be further subdivided, in view of geometric information, into classes of "cars," "pick-up trucks," "buses," "semi-trucks," and the like. Similarly, type "vulnerable road users" can be further subdivided into classes of "pedestrians," "bicyclists," "motorcyclists," "skateboarders," and the like.

Figure 6:
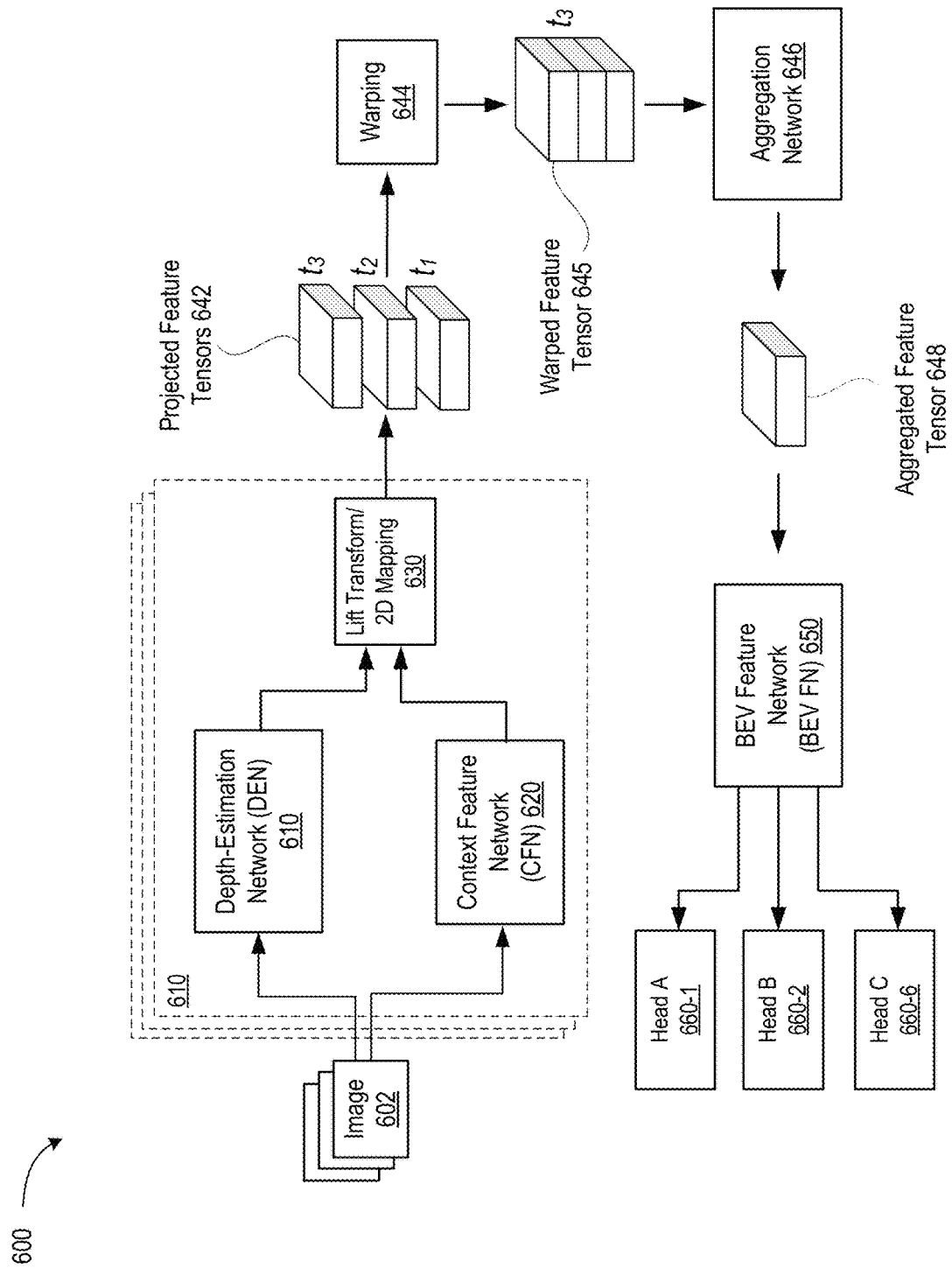
FIG. 6 is a schematic diagram illustrating operations of a bird's-eye view model that uses temporal aggregation, in accordance with some implementations of the present disclosure.

FIG. 6 is a schematic diagram illustrating operations 600 of a bird's-eye view model that uses temporal aggregation, in accordance with some implementations of the present disclosure. Operations 600 can include processing image(s) 602 using a DEN 610 to output depth distributions 612, a CFN 620 to output feature vectors 622, and a lift transform/2D mapping 630 to obtain projected feature tensors 642. DEN 610 can be trained using depth data, e.g., as described in conjunction with FIG. 3A-C and/or FIG. 4A-B, or in any other similar way. Images 602 can be associated with frames acquired at different times, $t_1, t_2, t_3 \ldots$. Operations of blocks 610-630 can be performed separately for different frames, e.g., sequentially (using a single instance of DEN 610 and CFN 620) or in parallel (e.g., using multiple instances of DEN 610 and CFN 620). The projected feature tensors 642 can then be warped using warping 644 to a common reference time, which can be one of the times $t_1, t_2, t_3 \ldots$, e.g., the current time or the most recent available time (indicated as time $t_3$ in FIG. 6). Warping 644 can be a mathematical transformation that eliminates the (independently known) motion of the sensing system (e.g., the ego motion of the autonomous vehicle) and generates a warped feature tensor 645. As a result of warping 644, objects that are at rest relative to the ground will be described by elements of the warped feature tensor 645 that are associated with the same coordinates x, y whereas moving objects will be described by elements that are spread out along directions of the objects' motion. Warped feature tensor 645 can then be processed using an aggregation network 646, which can be a convolutional network with kernels extending over two or more temporal components of the warped feature tensor 645. The aggregation network 646 outputs an aggregated tensor 648 that can be processed by a BEV FN 650 (and also further processed by various classification heads 660-$n$), e.g., similarly to how projected feature tensors are processed by a BEV feature network in operations of FIG. 3A-C or FIG. 4A-B.

Figure 7:
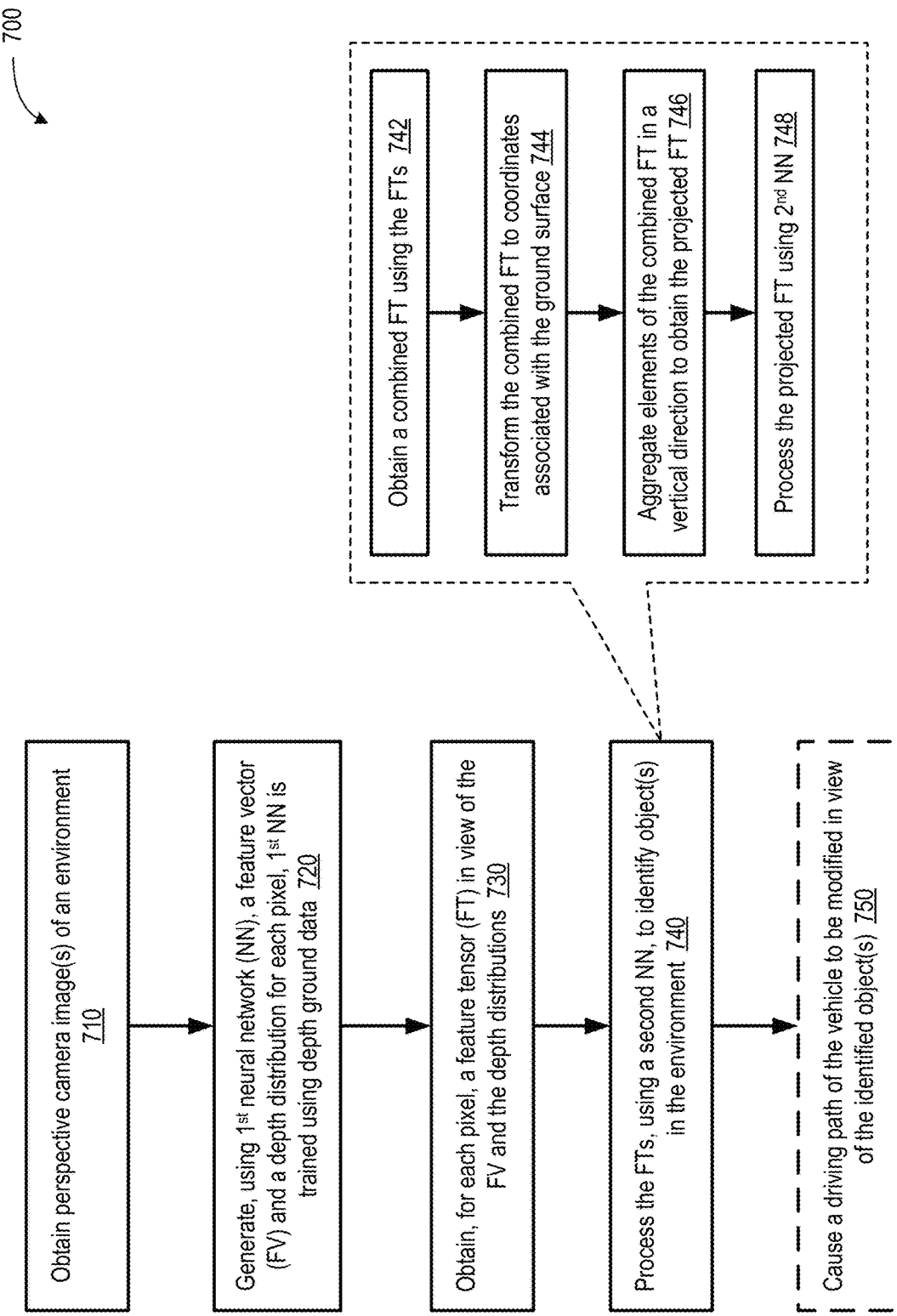
FIG. 7 illustrates an example method of deploying a model that uses a bird's-eye view representation and is trained using depth ground truth data for efficient detection and classification of objects, in accordance with some implementations of the present disclosure.
Figure 8:
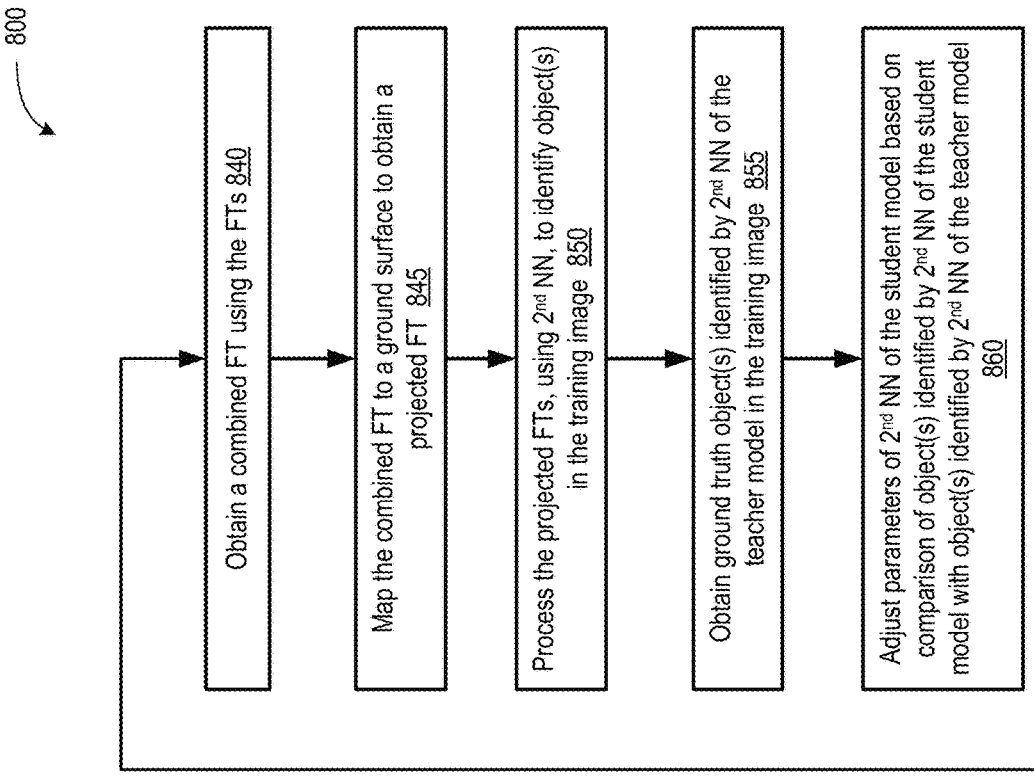
FIG. 8 illustrates an example method of using depth ground truth data for training a model that deploys a bird's-eye view representation, for efficient detection and classification of objects, in accordance with some implementations of the present disclosure.
Figure 8:
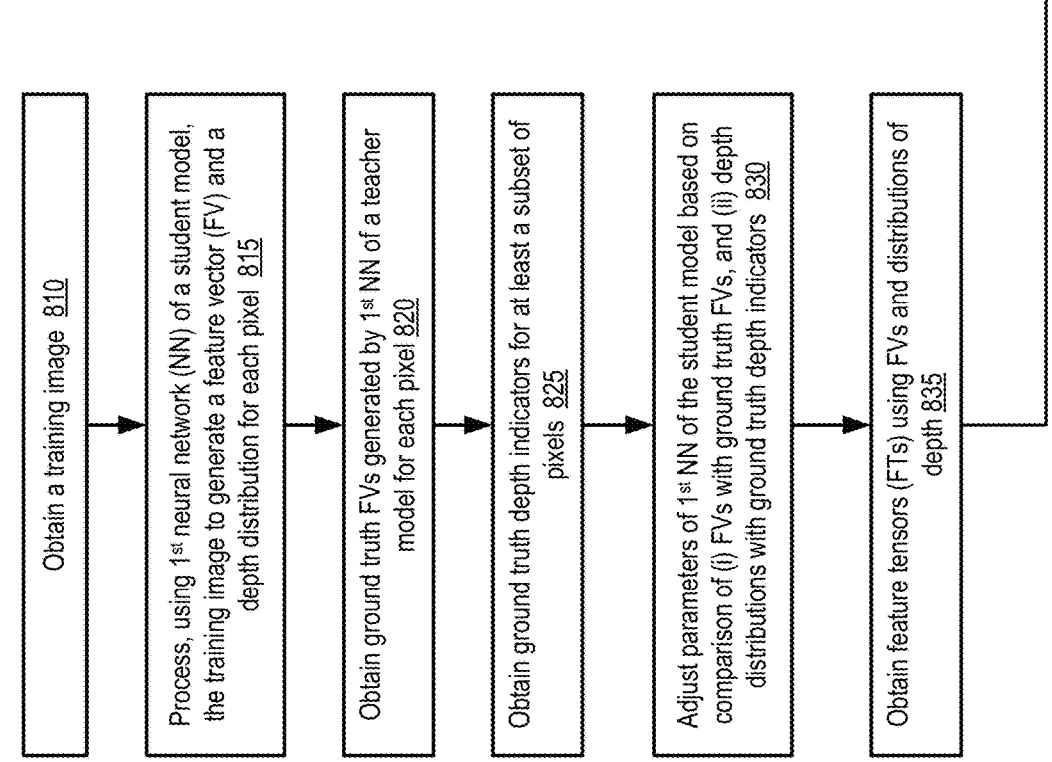

FIGS. 7-8 illustrate example methods 700-800 of deploying machine-learning models that use bird's-eye view and are trained using depth ground truth data for efficient detection and classification of objects. A processing device, having one or more processing units (CPUs) and memory devices communicatively coupled to the CPU(s), can perform methods 700-800 and/or each of their individual functions, routines, subroutines, or operations. The processing device executing methods 700-800 can perform instructions issued by various components of the sensing system 110 or data processing system 120 of FIG. 1, e.g., ODCM 132. In some implementations, methods 700-800 can be directed to systems and components of an autonomous driving vehicle, such as the autonomous vehicle 100 of FIG. 1. Methods 700-800 can be used to improve performance of the processing system 120 and/or the autonomous vehicle control system 140. In certain implementations, a single processing thread can perform methods 700-800. Alternatively, two or more processing threads can perform methods 700-800, each thread executing one or more individual functions, routines, subroutines, or operations of the methods. In an illustrative example, the processing threads implementing methods 700-800 can be synchronized (e.g., using semaphores, critical sections, and/or other thread synchronization mechanisms). Alternatively, the processing threads implementing methods 700-800 can be executed asynchronously with respect to each other. Various operations of methods 700-800 can be performed in a different order compared with the order shown in FIGS. 7-8. Some operations of methods 700-800 can be performed concurrently with other operations. Some operations can be optional.

FIG. 7 illustrates an example method 700 of deploying a model that uses a bird's-eye view representation and is trained using depth ground truth data for efficient detection and classification of objects, in accordance with some implementations of the present disclosure. Method 700 can use real-time images obtained by one or more cameras of a vehicle, or by cameras mounted on any other suitable application platform. Cameras can be optical range cameras and/or IR cameras, including panoramic (surround-view) cameras, partially panoramic cameras, high-definition (high-resolution) cameras, close-view cameras, cameras having a fixed field of view (relative to the vehicle), cameras having a dynamic (adjustable) field of view, cameras having a fixed or adjustable focal distance, cameras having a fixed or adjustable numerical aperture, and any other suitable cameras. Optical range cameras can further include night-vision cameras. Images acquired by cameras can include various metadata that provides geometric associations between image pixels and spatial locations of objects, correspondence between pixels of different images, and the like. In some implementations, method 700 can be performed by ODCM 132, or any other similar model, which may be a part of a perception system of an autonomous vehicle, a vehicle that deploys driver assistance technology, or a part of any other application platform that uses object detection and classification.

At block 710, method 700 can include obtaining one or more perspective camera images of an environment (e.g., images 302 of FIGS. 3A-C). At block 720, method 700 can include generating, using a first NN, for each pixel of a set of pixels of the one or more perspective camera images, a feature vector (FV), and a depth distribution for a portion of the environment imaged by a corresponding pixel. In some implementations, the set of pixels can include all pixels of the one or more perspective camera images. In some implementations, the set of pixels can include only a portion of all pixels of the one or more perspective camera images.

The first NN can include one or more subnetworks, including encoder network 305, DEN 310, CFN 320, and/or other subnetwork. In some implementations, the feature vector for each pixel of the set of pixels can be output by a first subnetwork (e.g., CFN 320) of the first NN. The depth distribution for each pixel of the set of pixels can be output by a second subnetwork (e.g., DEN 310) of the first NN. For example, the feature vectors can be FVs 322 output by CFN 320, and the depth distributions can be depth distributions 312 output by DEN 310. In some implementations, the first NN can be trained using a plurality of training images and a depth ground truth data for the plurality of training images. In some implementations, the depth ground truth data can include lidar-determined distances to one or more objects in at least a subset of the plurality of training images. In some implementations, the second subnetwork (e.g., DEN 310) can be trained, using the depth ground truth data, prior to training of the first subnetwork (e.g., CFN 320).

In some implementations, the first NN can be a part of a student model trained using distillation techniques, e.g., as described in conjunction with FIGS. 4A-B. More specifically, the depth ground truth data can include a depth estimate for at least a subset of pixels of the plurality of training images. For example, depth estimates can be available for each Nth pixel of the training images. The depth estimate (e.g., depth distributions 411) can be output by a first NN (e.g., Teacher DEN 410-S) of a teacher model (e.g., teacher ODCM 401-T).

At block 730, method 700 can include obtaining, for each pixel of the set of pixels, a feature tensor (FT). The feature tensor (e.g., FT 432) can be obtained in view of the feature vector for a respective pixel and the depth distribution for the respective pixel. For example, the feature tensor can be obtained using an outer product of the feature vector and the depth distribution (for each pixel). Additionally, obtaining the feature tensor can include performing a lift transform, e.g., as described in conjunction with FIG. 3A.

At block 740, method 700 can include processing the obtained feature tensors, using a second NN, to identify one or more objects in the environment. As depicted with the callout portion of FIG. 7, processing the obtained feature tensors can include a number of operations. More specifically, at block 742, method 700 can include obtaining a combined feature tensor (e.g., combined FT 334) using the feature tensors for each of the set of pixels. Method 700 can continue with mapping the combined feature tensor to a ground surface (or any other reference surface) to obtain a projected feature tensor (e.g., projected FT 342). For example, mapping the combined feature tensor to the ground surface can include, transforming, at block 744, the combined feature tensor to a set of coordinates associated with the ground surface (e.g., a set of Cartesian coordinates x,y,z, cylindrical coordinates r,θ,z, or any other suitable coordinates) and aggregating, at block 746, elements of the combined feature tensor in a vertical direction to obtain the projected feature tensor. For example, to obtain the projected feature tensor, the elements of the combined feature tensor associated with different values of z (and the same values of x, y or r, θ) can be added together.

At block 748, method 700 can continue with using the second NN to process the projected feature tensor to identify one or more objects in the environment. In some implementations, the second NN can include a first classification head (e.g., semantics head 560-1 in FIG. 5) configured to output semantic segmentation for the one or more objects in the environment. The second NN can also include at least one second classification head (e.g. instance centers head 560-2 and/or instance offsets head 560-3) configured to output geometric information associated with locations of the one or more objects in the environment. In some implementations, e.g., when the NNs are trained using the distillation framework, the second NN (e.g., student BEV FN 450-S) can be trained using outputs of a second NN (e.g., teacher BEV FN 450-T) of the teacher training model (e.g., teacher ODCM 401-T).

In some implementations, e.g., as described in conjunction with FIG. 6, the model (e.g., ODCM 132) can perform temporal aggregation of images acquired at different times. More specifically, the one or more perspective camera images obtained in conjunction with block 710, can be associated with a first time (e.g., time $t_1$). Temporal aggregation can include obtaining one or more additional perspective camera images associated with at least a second time (e.g., times $t_2$, $t_3$, etc.). Temporal aggregation can then include generating, using the one or more additional perspective camera images, an additional projected feature tensor and performing a concurrent processing of the projected feature tensor and the additional projected feature tensor (e.g., as illustrated by processing of projected feature tensors 642). In some implementations, the concurrent processing can include a warping transformation (e.g., warping 644) and an application of an aggregation NN (e.g., aggregation network 646). The aggregation NN can include one or more convolutional kernels configured to aggregate elements of the projected feature tensor with elements of the additional projected feature tensor (or with multiple additional feature tensors).

In those implementations where the perception system performing method 700 is deployed on a vehicle, method 700 can continue, at block 750, with the perception system causing a driving path of the vehicle to be determined in view of the one or more identified objects in the environment of the vehicle.

FIG. 8 illustrates an example method 800 of using depth ground truth data for training a model that deploys a bird's-eye view representation, for efficient detection and classification of objects, in accordance with some implementations of the present disclosure. Method 800 can be used to train ODCM 132 or any other similar model. Method 800 can use previously recorded images and other sensing data obtained by scanning an environment of a vehicle (or any other relevant environment) using a plurality of sensors of the sensing system of the vehicle, e.g., lidars, radars, sonars, and the like. At block 810, method 800 can include obtaining a training image, e.g., as part of a set of multiple training images. At block 815, method 800 can include processing, using a first NN of the student model, the training image to generate a plurality of feature vectors and a plurality of depth distributions. For example, the first NN of the student model can include some or both of student DEN 410-S and student CFN 420-S, e.g., as shown in FIGS. 4A-B. Each feature vector of the plurality of feature vectors (e.g., FVs 422) and each depth distribution of the plurality of depth distributions (e.g., depth distributions 412) can be associated with a respective pixel of a plurality of pixels of the training image.

At block 820, method 800 can continue with obtaining a plurality of ground truth feature vectors (e.g., feature vectors 421) generated by a first NN of a teacher model. For example, the first NN of the teacher model can include some or both of teacher DEN 410-T and teacher CFN 420-T. Each ground truth feature vector of the plurality of ground truth feature vectors can be associated with a respective pixel of the plurality of pixels of the training image. At block 825, method 800 can continue with obtaining a plurality of ground truth depth indicators. Each ground truth depth indicator of the plurality of ground truth depth indicators can be associated with a respective pixel of at least a subset of the plurality of pixels of the training image. In some implementations, each of the plurality of ground truth depth indicators can include a depth distribution (e.g., a depth distribution 411, as illustrated in FIG. 4A) obtained by the first NN of the teacher model for the associated pixel. In some implementations, each of the plurality of ground truth depth indicators can include a specific distance, obtained by a range-sensing device, to a portion of an environment imaged by the associated pixel (e.g., depth data 404, as illustrated in FIG. 4B).

At block 830, method 800 can include adjusting parameters of the first NN of the student model based on a comparison of the plurality of feature vectors (e.g., feature vectors 422) with the plurality of ground truth feature vectors (e.g., feature vectors 422), and a comparison of the plurality of depth distributions (e.g., depth distributions 412) with the plurality of ground truth depth indicators.

At block 835, method 800 can include obtaining a plurality of feature tensors. Each feature tensor of the plurality of feature tensors can be obtained using a respective feature vector of the plurality of feature vectors and a respective depth distribution of the plurality of depth distributions (e.g., as described in conjunction with FIG. 3A). At block 840, method 800 can continue with obtaining a combined feature tensor (e.g., combined feature tensor 334) using the plurality of feature tensors. At block 845, method 800 can include mapping the combined feature tensor to a ground surface to obtain a projected feature tensor (e.g., using the lift transform/2D mapping 430). At block 850, method 800 can continue with processing the projected feature tensor, using a second NN of the student model (e.g., student BEV FN 450-S), to identify one or more objects in the training image (e.g., detected objects 452). At block 855, method 800 can include obtaining one or more ground truth objects (e.g., detected objects 451) identified by a second NN of the teacher model (e.g., teacher BEV FN 450-T) in the training image. At block 860, method 800 can continue with adjusting parameters of the second NN of the student model (e.g., student BEV FN 450-S) based on a comparison of the one or more objects identified by the second NN of the student model with the one or more objects identified by the second NN of the teacher model.

Figure 9:
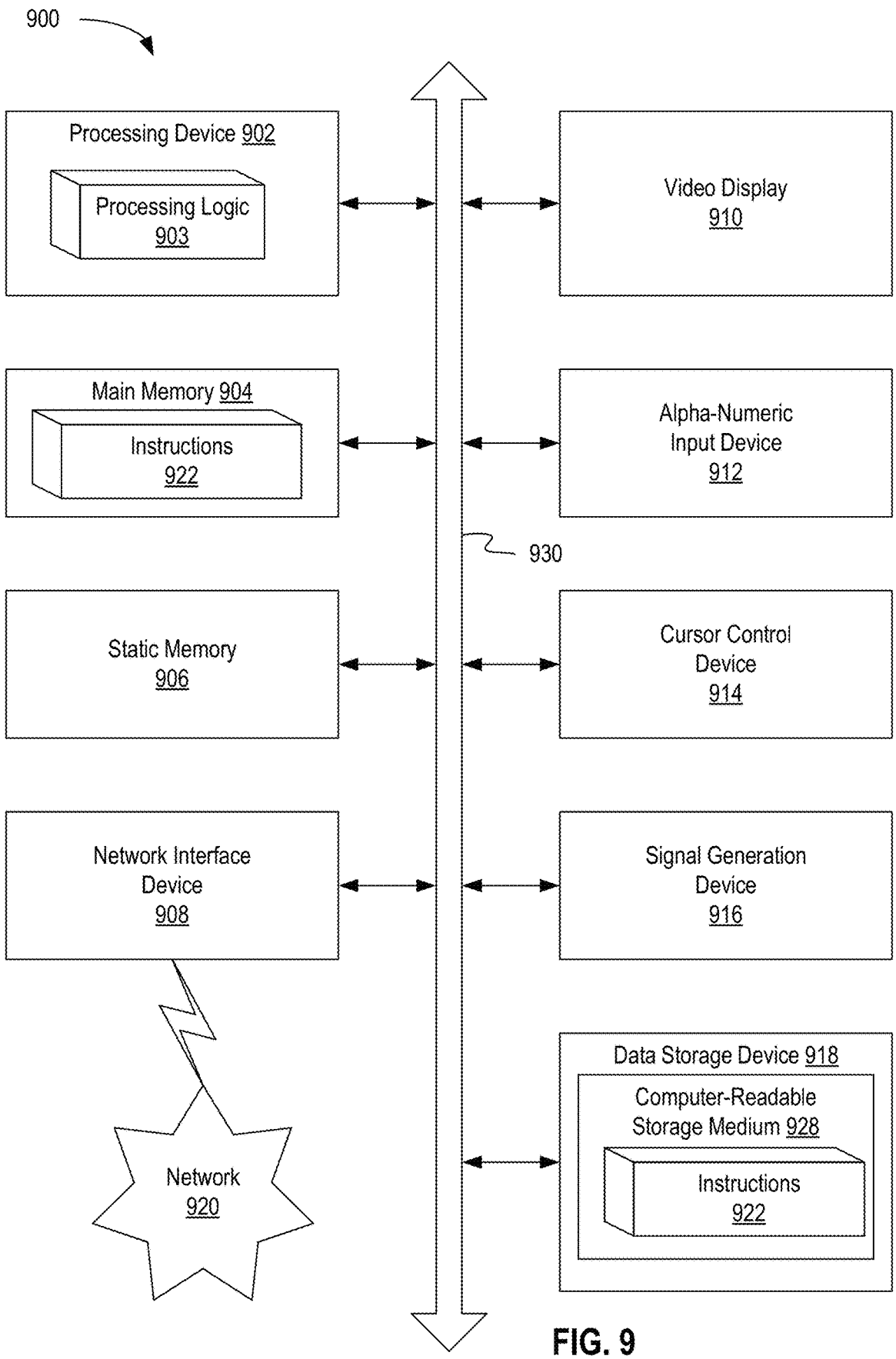
FIG. 9 depicts a block diagram of an example computer device capable of operating and/or training a model that uses bird's-eye view and is trained using depth ground truth data for efficient detection and classification of objects, in accordance with some implementations of the present disclosure.

FIG. 9 depicts a block diagram of an example computer device 900 capable of operating and/or training a model that uses bird's-eye view and is trained using depth ground truth data for efficient detection and classification of objects, in accordance with some implementations of the present disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing method 700 of using depth ground truth data for training a model that deploys a bird's-eye view representation and/or method 800 of using depth ground truth data for training a model that deploys a bird's-eye view representation, for efficient detection and classification of objects.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing method 700 of using depth ground truth data for training a model that deploys a bird's-eye view representation and/or method 800 of using depth ground truth data for training a model that deploys a bird's-eye view representation, for efficient detection and classification of objects.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
obtaining one or more perspective camera images of an environment;
generating, using a first neural network (NN), for each pixel of a set of pixels of the one or more perspective camera images,
a feature vector (FV), and
a depth distribution for a portion of the environment imaged by a corresponding pixel, wherein the first NN is trained using a plurality of training images and a depth ground truth data for the plurality of training images;
obtaining, for each pixel of the set of pixels, a feature tensor (FT) in view of (i) the FV for a respective pixel and (ii) the depth distribution for the respective pixel; and
processing the obtained FTs, using a second NN, to identify one or more objects in the environment.

2. The method of claim 1, wherein processing the obtained FTs comprises:
obtaining a combined FT using the FTs for the set of pixels;
mapping the combined FT to a ground surface to obtain a projected FT; and
using the second NN to process the projected FT.

3. The method of claim 2, wherein mapping the combined FT to the ground surface comprises:
transforming the combined FT to a set of coordinates associated with the ground surface; and
aggregating elements of the combined FT in a vertical direction to obtain the projected FT.

4. The method of claim 2, wherein the one or more perspective camera images are associated with a first time, the method further comprising:
obtaining one or more additional perspective camera images associated with at least a second time;
generating, using the one or more additional perspective camera images, an additional projected FT; and
performing a concurrent processing of the projected FT and the additional projected FT.

5. The method of claim 4, wherein the concurrent processing is performed by an aggregation NN comprising one or more convolutional kernels configured to aggregate elements of the projected FT with elements of the additional projected FT.

6. The method of claim 1, wherein the second NN comprises:
a first classification head configured to output semantic segmentation for the one or more objects in the environment; and
at least one second classification head configured to output geometric information associated with locations of the one or more objects in the environment.

7. The method of claim 1, wherein the depth ground truth data comprises a depth estimate for at least a subset of pixels of the plurality of training images, wherein the depth estimate is output by a first NN of a teacher model.

8. The method of claim 7, wherein the second NN is trained using outputs of a second NN of the teacher model.

9. The method of claim 1, wherein the FT for each pixel of the set of pixels is output by a first subnetwork of the first NN, wherein the depth distribution for each pixel of the set of pixels is output by a second subnetwork of the first NN, and wherein the second subnetwork is trained, using the depth ground truth data, prior to training of the first subnetwork.

10. The method of claim 1, wherein the depth ground truth data comprises lidar-determined distances to one or more objects in at least a subset of the plurality of training images.

11. A method of training a student model, the method comprising:
obtaining a training image;
processing, using a first neural network (NN) of the student model, the training image to generate
a plurality of feature vectors (FVs), and
a plurality of depth distributions, wherein each FV of the plurality of FVs and each depth distribution of the plurality of depth distributions are associated with a respective pixel of a plurality of pixels of the training image;
obtaining a plurality of ground truth FVs generated by a first NN of a teacher model, wherein each ground truth FV of the plurality of ground truth FVs is associated with a respective pixel of the plurality of pixels of the training image;
obtaining a plurality of ground truth depth indicators, wherein each ground truth depth indicator of the plurality of ground truth depth indicators is associated with a respective pixel of at least a subset of the plurality of pixels of the training image; and
adjusting parameters of the first NN of the student model based on
a comparison of the plurality of FVs with the plurality of ground truth FVs, and
a comparison of the plurality of depth distributions with the plurality of ground truth depth indicators.

12. The method of claim 11, further comprising:
obtaining a plurality of feature tensors (FTs), wherein each FT of the plurality of FTs is obtained using a respective FV of the plurality of FVs and a respective depth distribution of the plurality of depth distributions;
obtaining a combined FT using the plurality of FTs;
mapping the combined FT to a ground surface to obtain a projected FT;
processing the projected FT, using a second NN of the student model, to identify one or more objects in the training image;
obtaining one or more ground truth objects identified by a second NN of the teacher model in the training image; and
adjusting parameters of the second NN of the student model based on a comparison of the one or more objects identified by the second NN of the student model with the one or more objects identified by the second NN of the teacher model.

13. The method of claim 11, wherein each of the plurality of ground truth depth indicators comprises at least one of (i) a depth distribution obtained by the first NN of the teacher model for the respective pixel, or (ii) a distance, obtained by a range-sensing device, to a portion of an environment imaged by the respective pixel.

14. A system comprising:
a memory; and
a processing device communicative coupled to the memory, the processing device configured to:
  obtain one or more perspective camera images of an environment;
  generate, using a first neural network (NN), for each pixel of a set of pixels of the one or more perspective camera images,
    a feature vector (FV), and
    a depth distribution for a portion of the environment imaged by a corresponding pixel, wherein the first NN is trained using a plurality of training images and a depth ground truth data for the plurality of training images;
  obtain, for each pixel of the set of pixels, a feature tensor (FT) in view of (i) the FV for a respective pixel and (ii) the depth distribution for the respective pixel; and
  process the obtained FTs, using a second NN, to identify one or more objects in the environment.

15. The system of claim 14, wherein to process the obtained FTs, the processing device is to:
  obtain a combined FT using the FTs for the set of pixels;
  map the combined FT to a ground surface to obtain a projected FT; and
  use the second NN to process the projected FT.

16. The system of claim 15, wherein to map the combined FT to the ground surface, the processing device is to:
  transform the combined FT to a set of coordinates associated with the ground surface; and
  aggregate elements of the combined FT in a vertical direction to obtain the projected FT.

17. The system of claim 15, wherein the one or more perspective camera images are associated with a first time, and wherein the processing device is further to:
  obtain one or more additional perspective camera images associated with at least a second time;
  generate, using the one or more additional perspective camera images, an additional projected FT; and
  perform a concurrent processing of the projected FT and the additional projected FT, wherein the concurrent processing is performed by an aggregation NN comprising one or more convolutional kernels configured to aggregate elements of the projected FT with elements of the additional projected FT.

18. The system of claim 14, wherein the second NN comprises:
  a first classification head configured to output semantic segmentation for the one or more objects in the environment; and
  at least one second classification head configured to output geometric information associated with locations of the one or more objects in the environment.

19. The system of claim 14, wherein the FT for each pixel of the set of pixels is output by a first subnetwork of the first NN, wherein the depth distribution for each pixel of the set of pixels is output by a second subnetwork of the first NN, and wherein the second subnetwork is trained, using the depth ground truth data, prior to training of the first subnetwork.

20. The system of claim 14, wherein the depth ground truth data comprises lidar-determined distances to one or more objects in at least a subset of the plurality of training images.

* * * * *